United States Patent
Beller et al.

(10) Patent No.: US 11,774,975 B2
(45) Date of Patent: Oct. 3, 2023

(54) COLLISION ZONE DETECTION FOR VEHICLES

(71) Applicant: Zoox, Inc., Foster City, CA (US)

(72) Inventors: Andrew E. Beller, San Francisco, CA (US); Zhenqi Huang, San Carlos, CA (US)

(73) Assignee: Zoox, Inc., Foster City, CA (US)

(*) Notice: Subject to any disclaimer, the term of this patent is extended or adjusted under 35 U.S.C. 154(b) by 0 days.

(21) Appl. No.: 17/732,845

(22) Filed: Apr. 29, 2022

(65) Prior Publication Data

US 2022/0261000 A1 Aug. 18, 2022

Related U.S. Application Data

(63) Continuation of application No. 16/547,480, filed on Aug. 21, 2019, now Pat. No. 11,360,480.

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 10,773,732 B1 * | 9/2020 | Alexander | ........... G05D 1/0212 |
| 10,829,116 B2 | 11/2020 | Iagnemma et al. | |
| 11,004,000 B1 | 5/2021 | Gutmann et al. | |
| 2016/0335892 A1 | 11/2016 | Okada et al. | |
| 2017/0372612 A1 | 12/2017 | Bai et al. | |
| 2018/0151075 A1 | 5/2018 | Claesson | |
| 2018/0162394 A1 | 6/2018 | Kamiya | |

(Continued)

FOREIGN PATENT DOCUMENTS

| JP | 2014093040 A | 5/2014 |
|---|---|---|
| WO | WO2019089591 A1 | 5/2019 |

OTHER PUBLICATIONS

Feng et al., "Method of Pedestrian-vehicle Conflict Eliminating at Unsignalized Mid-block Crosswalks for Autonomous Vehicles", The 5th International Conference on Transportation Information and Safety, Jul. 14-17, 2019, Liverpool, UK, pp. 511-519 (Year: 2019).*

(Continued)

*Primary Examiner* — Tamara L Weber
(74) *Attorney, Agent, or Firm* — Lee & Hayes, P.C.

(57) ABSTRACT

Techniques and methods for determining regions. For instance, a vehicle may determine a trajectory of the vehicle and a trajectory of an agent, such as a pedestrian. The vehicle may then determine one or more contextual factors. In some examples, the one or more contextual factors are associated with a location of the agent with respect to a crosswalk, a location of the vehicle with respect to the crosswalk, a state of the crosswalk, and/or the like. The vehicle may then determine the region using the trajectory of the vehicle, the trajectory of the agent, and the one or more contextual factors. Additionally, using a time buffer value and a distance buffer value associated with the region, the vehicle may determine whether to yield to the agent within the region.

20 Claims, 13 Drawing Sheets

(56) References Cited

U.S. PATENT DOCUMENTS

| | | |
|---|---|---|
| 2018/0253103 A1 | 9/2018 | Winkler et al. |
| 2019/0049970 A1* | 2/2019 | Djuric ............. B60W 60/00276 |
| 2019/0346851 A1 | 11/2019 | Liu et al. |
| 2020/0064850 A1* | 2/2020 | Hong ................... G05D 1/0214 |
| 2020/0073382 A1* | 3/2020 | Noda ................... G05D 1/0088 |
| 2021/0031760 A1 | 2/2021 | Ostafew et al. |
| 2021/0053561 A1 | 2/2021 | Beller et al. |
| 2021/0055733 A1 | 2/2021 | Beller et al. |
| 2021/0261159 A1 | 8/2021 | Pazhayampallil et al. |

OTHER PUBLICATIONS

Office Action for U.S. Appl. No. 16/547,480, dated Aug. 18, 2021, Beller, "Collision Zone Detection for Vehicles", 23 Pages.

Office Action for U.S. Appl. No. 16/547,419, dated Jun. 15, 2021, Beller, "Collision Prediction and Avoidance for Vehicles", 19 pages.

The PCT Search Report and Written Opinion dated Nov. 13, 2020 for PCT application No. PCT/US20/46647, 14 pages.

The International Preliminary Report on Patentability for PCT Application No. PCT/US20/46647, dated Mar. 3, 2022, 8 pages.

\* cited by examiner

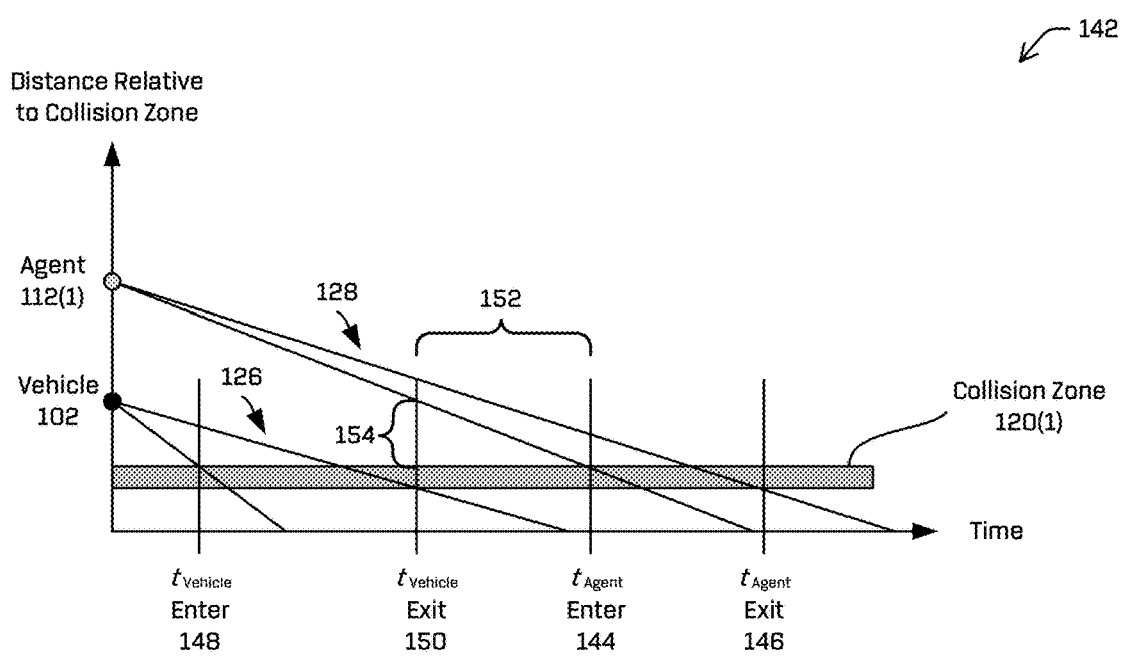
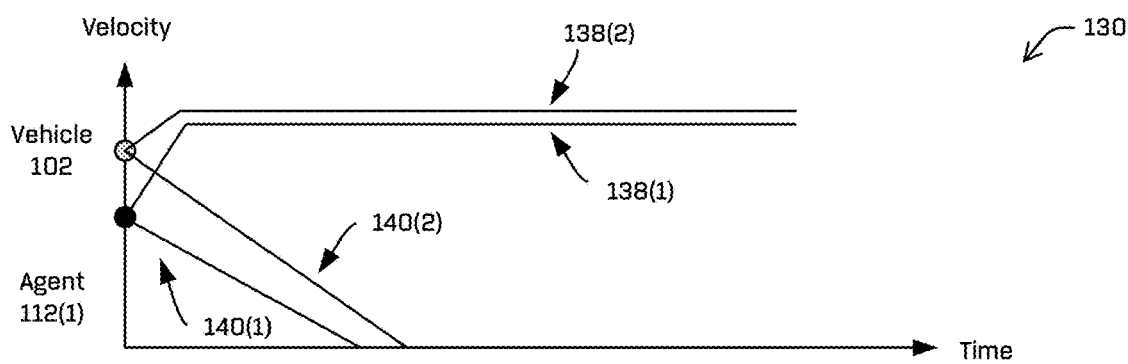
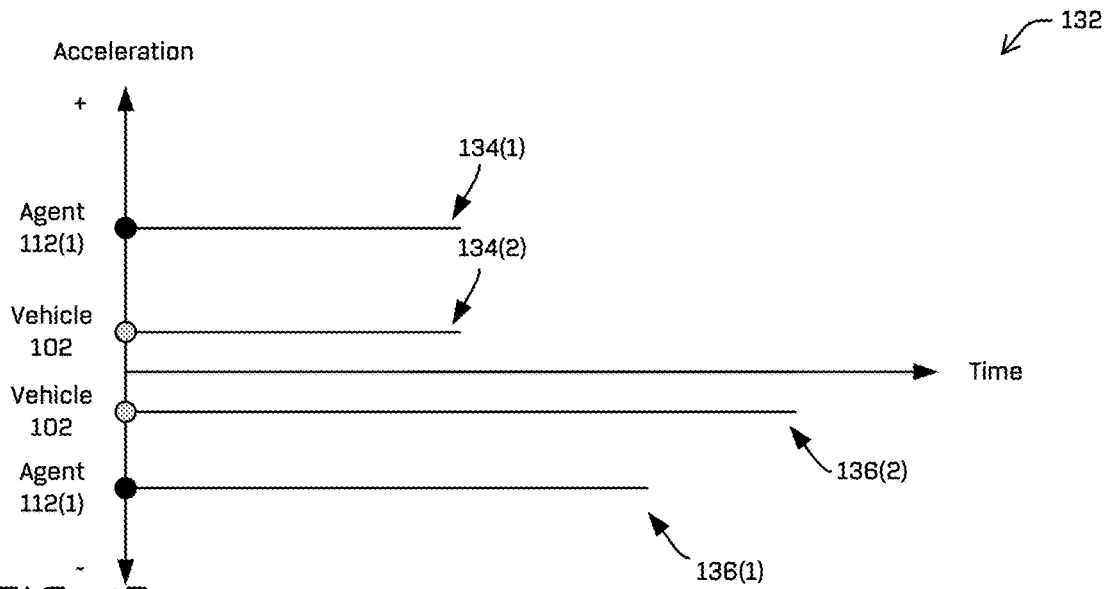
FIG. 1B

COLLISION ZONE DETECTION FOR VEHICLES

CROSS-REFERENCE TO RELATED APPLICATION

This application is a continuation of U.S. patent application Ser. No. 16/547,480, filed on Aug. 21, 2019. The entire contents of the priority application are hereby incorporated by reference as if fully set forth.

BACKGROUND

Vehicles may be equipped with collision avoidance systems configured to detect and avoid objects in an operating environment. The objects may include mobile objects, such as other vehicles, cyclists, pedestrians, etc. Traditional collision avoidance systems may avoid collisions by simply identifying the presence of surfaces in an environment and adjusting a velocity of a vehicle to avoid collision with a surface. However, these traditional systems may cause the vehicle to yield in situations in which it is unnecessary and unnatural, thereby potentially causing traffic delays.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1B is an illustration of an example time-space overlap of a position cone associated with agent trajectories and planned speeds of an autonomous vehicle relative to a region, in which a collision avoidance system of the autonomous vehicle may determine a potential collision between the autonomous vehicle and an agent based on the time-space overlap, in accordance with embodiments of the disclosure.

FIGS. 5A-5I are illustrations of generating regions based on locations of agents within a crosswalk, in according with embodiments of the disclosure.

DETAILED DESCRIPTION

Figure 1A:
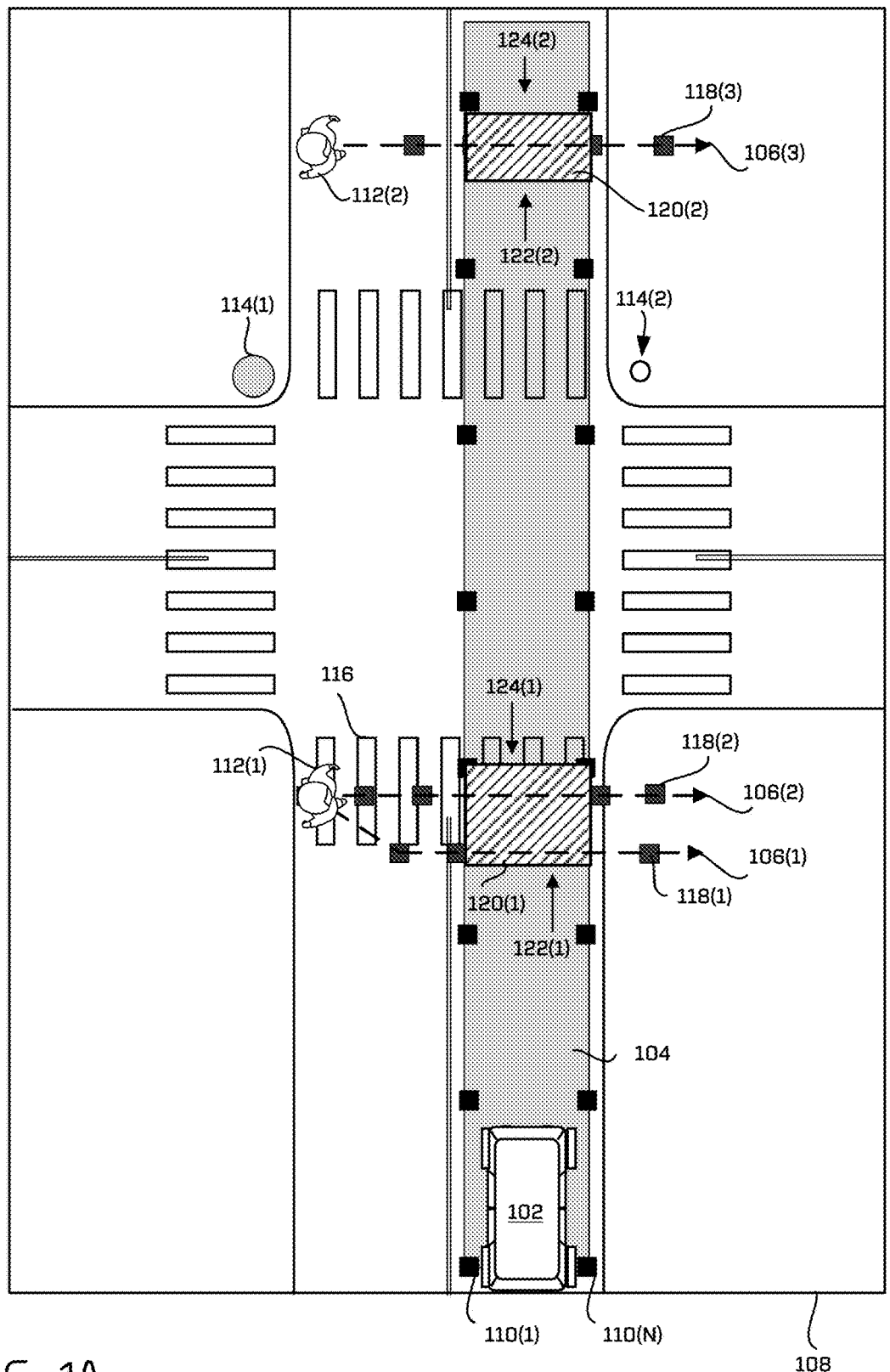
FIG. 1A is an illustration of an autonomous vehicle in an environment, wherein a path polygon of the autonomous vehicle and estimated agent trajectories are overlaid in the illustration representing a two-dimensional map of the environment generated by a collision avoidance system of the autonomous vehicle to determine region(s) between the autonomous vehicle and the agents, in accordance with embodiments of the disclosure.

As discussed above, vehicles may be equipped with collision avoidance systems configured to detect and avoid objects in an operating environment. The objects may include mobile objects, such as other vehicles, cyclists, pedestrians, etc. Traditional collision avoidance systems may avoid collisions by simply identifying an intersection of trajectories and adjusting a velocity of a vehicle to avoid collision. However, these traditional systems may cause the vehicle to yield in situations in which it is unnecessary and/or unnatural. For example, a vehicle approaching a crosswalk may yield to a pedestrian that is approaching the crosswalk, even when the pedestrian slows down to yield for vehicle for various reasons, such as the crosswalk being in a non-crossable state. This type of yielding may cause potential traffic delays, as the vehicle should have navigated through the crosswalk before the pedestrian.

As such, this disclosure is directed to techniques for improving collision prediction and avoidance between a vehicle and agents (e.g., dynamic objects) in an environment. The vehicle may include an autonomous or semi-autonomous vehicle. A vehicle computing system may be configured to determine regions between the vehicle and the agents based on probable paths and velocities associated therewith and/or contextual data associated with the environment for which the vehicle is navigating. The vehicle computing system may then be configured to determine various time and/or distance thresholds that are used for the collision prediction. Additionally, based on the collision prediction, the vehicle computing system may be configured to determine an action to perform, such as yielding to one or more agents in order to avoid a collision in the one or more regions or navigating through the one or more regions when the vehicle determines not to yield to the one or more agents.

The vehicle computing system may be configured to generate a point path polygon (path polygon) representing a two-dimensional path of the vehicle (e.g., vehicle path) through the environment. The path polygon may include a plurality of point pairs (or simply points) along a planned path of the vehicle. In various examples, the points may include a representation of a left and a right side of the vehicle. For example, the left point may represent a left most extent of the vehicle (e.g., a position of an outer edge of a fender on a left side of the vehicle), and the right point may represent a right most extent of the vehicle (e.g., a position of an outer edge of a fender on a right side of the vehicle). In some examples, the left point and/or the right point of a point pair may include a point buffer on a respective side of the vehicle. As an illustrative example, the left point may represent a position of an outer edge of a left bumper plus three inches, and the right point may represent a position of an outer edge of a right bumper plus three inches. The points and/or point pairs of the path polygon may represent points on or proximate to the front of the vehicle, the back of the vehicle, or in between the front and back of the vehicle, though any relative position along the vehicle is contemplated.

In various examples, a point buffer associated with the left point and/or the right point of a point pair may be determined based on the planned path of the vehicle. In such examples, the point buffer associated with a left point and/or a right point may be adjusted based on a planned maneuver of the vehicle, such as, for example, a turn. For example, for a vehicle turning left, a left point may represent a position of an outer edge of the left tire at maximum deflection plus a point buffer (e.g., 3 inches, 6 inches, 12 inches, 3 feet, etc.), and/or a right point may represent a position of an outer edge of the right tire at maximum deflection plus a point buffer (e.g., 3 inches, 6 inches, 12 inches, 3 feet, etc.). The point buffers on the left and right side may be the same or different. In some examples, such point buffers may be dependent on a location of the vehicle (e.g., smaller point buffers in highways where no pedestrians are expected, higher point buffers in narrow, pedestrian crowded areas, or the like).

The vehicle computing system may be configured to identify agents in the environment. In some examples, the agents may be identified based on sensor data from sensors (e.g., cameras, motion detectors, light detection and ranging (LIDAR), radio detection and ranging (RADAR), etc.) of the vehicle. In some examples, the agents may be identified based on sensor data received from remote sensors, such as, for example, sensors associated with another vehicle or sensors mounted in an environment that are configured to share data with a plurality of vehicles.

The vehicle computing system may determine one or more trajectories of the agent (e.g., positions, velocities, accelerations, etc. of the agent as it moves through an environment) based on the sensor data. The one or more trajectories of the agent may represent possible paths that a center of the agent may travel through the environment. The center of the agent may include an estimated center of mass, an estimated volumetric center point of the agent, or the like. In some instances, the vehicle computing system may determine one or more trajectories of more than one agent.

Additionally, the vehicle computing system may determine one or more contextual factors associated with the environment for which the vehicle is navigating. In some examples, the contextual factor(s) are identified based on the sensor data from the sensors of the vehicle. In some examples, the contextual factor(s) are identified based on the sensor data received from the remote systems. The contextual factor(s) may include, but are not limited to, whether the location of the agent (and/or potential location of the agent based on a trajectory) relative to symbols in a map (e.g., ig the agent is within a crosswalk), whether the location of the agent (and/or potential location of the agent based on a trajectory) is between the vehicle and a front end of the symbol (e.g., where the front end is the closest end of the crosswalk that is located along the path of the vehicle), whether the location of the agent (and/or potential location of the agent based on a trajectory) is further from the vehicle than a back end of the symbol (e.g., where the back end is the farthest end of the crosswalk that is located along the path of the vehicle), whether the agent is crossing at a location of the environment for which there is not a crosswalk (e.g., the agent is jaywalking), whether the crosswalk is in a crossable state or a non-crossable state, whether a location of the vehicle is already within the crosswalk, whether the vehicle is likely to stop within the crosswalk, and/or the like. While these are just a few examples of contextual factors, in other examples, the vehicle may determine additional and/or alternatively contextual factor(s).

Based on the path polygon of the vehicle and the one or more trajectories, the vehicle computing system may determine whether a region exists between the vehicle and the agent. In various examples, the region may include an area in which the path polygon and a trajectory of the one or more trajectories of the agent intersect. Additionally, the vehicle computing system may determine a starting end for the region and an ending end for the region using the contextual factor(s), where both the starting end and the encoding end are located along the path polygon of the vehicle.

For instance, the vehicle computing system may store rule(s) specifying the locations of the starting ends and the locations of the ending ends based on the contextual factor(s). For a first example, a first rule may indicate that when a location (and/or potential location) of an agent is within a crosswalk, then (1) the starting end of the region includes the front end of the crosswalk and (2) the ending end of the region includes the location (and/or potential location) of the agent and/or is located within a threshold distance after the location (and/or potential location) of the agent. For a second example, a second rule may indicate that when a location (and/or potential location) of an agent is further from the vehicle than the back end of the crosswalk, then (1) the starting end of the region includes the front end of the crosswalk and (2) the ending end of the region includes the location (and/or potential location) of the agent and/or is located within a threshold distance after the location (and/or potential location) of the agent.

For a third example, a third rule may indicate that when a location (and/or potential location) of an agent is between the vehicle and the front end of the crosswalk, then (1) the starting end of the region includes the location (and/or potential location) of the agent and/or is located within a threshold distance before the location (and/or potential location) of the agent relative to the vehicle, and (2) the ending end of the region includes the location (and/or potential location) of the agent and/or is located within a threshold distance after the location (and/or potential location) of the agent relative to the vehicle. For a fourth example, a fourth rule may indicate that when an agent is crossing a crosswalk that is in a non-crossable state, then (1) the starting end of the region includes the location (and/or potential location) of the agent and/or is located within a threshold distance before the location (and/or potential location) of the agent, and (2) the ending end of the region includes the location (and/or potential location) of the agent and/or is located within a threshold distance after the location (and/or potential location) of the agent.

For a fifth example, a fifth rule may indicate that when the vehicle is approaching a junction and likely to get struck in the crosswalk (e.g., a traffic light is about to turn red, etc.), then (1) the starting end of the region includes the front end of the crosswalk and (2) the ending end of the region includes the back end of the crosswalk. For a sixth example, a sixth rule may indicate that when the vehicle is stopped at a junction, then (1) the starting end of the region includes the location (and/or potential location) of the agent and/or is located within a threshold distance before the location (and/or potential location) of the agent, and (2) the ending end of the region includes the location (and/or potential location) of the agent and/or is located within a threshold distance after the location (and/or potential location) of the agent.

For a seventh example, a seventh rule may indicate that when the vehicle has already began navigating within the crosswalk, then (1) the starting end of the region includes the front end of the vehicle (e.g., the end of the front bumper of the vehicle), and (2) the ending end of the region includes the location (and/or potential location) of the agent and/or is located within a threshold distance after the location (and/or potential location) of the agent. In the examples above, a threshold distance may include, but is not limited to, half a meter, a one foot, two feet, one meter, two meters, and/or any other distance. Additionally, while these are just a couple of examples of rules that may be used when determining regions, in other examples, the vehicle computing system may use additional and/or alternative rules.

Based on a determination that a region exists between the path polygon and an agent trajectory, the vehicle computing system may apply a time-space overlap to the region to determine whether a collision may occur in the region and/or a likelihood that a collision may occur in the region. The time-space overlap may include planned speeds associated with the vehicle and probable (e.g., predicted) speeds associated with the agent, which may include associated uncertainties. In some examples, the time-space overlap may be represented as a position cone of probable speeds at which the agent may travel through the environment into and through the region. The probable speeds associated with the agent may represent a current speed of the agent (e.g., determined based on sensor data, a speed limit associated with the region, etc.), and probable changes to the current speed. The probable changes to the speed may be based on traffic laws, rules of the road, local driving etiquette, traffic patterns, semantic classification of the agent, predicted interactions of agents in the environment, normal walking speeds of pedestrians, or the like. The probable speeds may include aggressive driving behaviors and conservative driving behaviors. An aggressive driving profile (e.g., aggressive driving behaviors) is associated with higher maximum speeds, higher maximum accelerations, and/or shorter reaction times than a conservative driving profile (e.g., conservative driving behaviors), while a conservative driving profile may be associated with lower minimum speeds, lower minimum accelerations, and longer reaction times than an aggressive driving profile. In at least one example, an entry point of an agent into a region may be based on an aggressive speed estimate and an exit point of the agent out of the region may be based on a conservative speed estimate. In such an example, the agent's time spent in the region is maximized as a worst-case scenario. Any other combination of conservative and aggressive behaviors of the agent is also contemplated.

In some examples, the time-space overlap may include one or more probability density functions (PDFs) associated with probable positions of the agent based on time. In such examples, the PDF may represent aggressive and conservative motion as well as uncertainties based on accelerations and/or decelerations of the agent, such as those based on traffic laws, rules of the road, local driving etiquette, traffic patterns, semantic classification of the agent, or the like. In various examples, the PDFs may be represented as one or more curves (e.g., Gaussian distributions) overlaid on the region based on timing. Integrations of multiple PDFs (e.g., that of the agent(s) and/or the vehicle) within the area of the region (e.g. integrating the PDFs only in the regions which overlap with the region) may yield a probability. Such probabilities may, in turn, be used to inform planning and decision making.

In various examples, the vehicle computing system may determine whether a collision may occur based on the time-space overlap. In some examples, the vehicle computing system may determine that, based on a position cone associated with the agent, the vehicle and the agent may collide in the region, or otherwise have a higher probability that a collision is likely. For example, the computing device may determine an entry time associated with an entry point of the agent into the region based on an aggressive speed estimate and an exit time associated with an exit point of the agent out of the region based on a conservative speed estimate. The vehicle computing system may compare the entry time and the exit times of the agent to entry and exit times associated with the vehicle. If the entry and exit times associated with the agent and the vehicle overlap, the vehicle computing system may determine that the agent and the vehicle may collide in the region.

In some instances, the vehicle computing system may determine that there is no overlap between the predicted vehicle positions and the predicted agent positions within the region. In such instances, the vehicle computing system may determine a time buffer value and/or a distance buffer value between the vehicle and the agent associated with the region. In some examples, the time buffer value may represent the shortest predicted difference in time between the vehicle being located within the region and the agent being located within the region. In some examples, the distance buffer value may represent a shortest predicted distance between the vehicle and the region when the agent is located within the region and/or between the agent and the region when the vehicle is located within the region. The vehicle computing system may then determine if the time buffer value is equal to or greater than a time threshold and/or the distance buffer value is equal to or greater than a distance threshold.

The vehicle computing system may determine the time threshold and/or the distance threshold using one or more factor values. The one or more factors may include, but are not limited to, a base factor value, a hysteresis factor value, a comfort factor value, an assertiveness factor value, a velocity of the vehicle, and/or the like, which are described in detail below. Additional details of the one or more factors can be found in application Ser. No. 16/539,928, filed Aug. 13, 2019, and application Ser. No. 16/440,793, filed Jun. 13, 2019, both of which are incorporated herein by reference in their entirety.

After determining the time threshold, the vehicle computing system may compare the time buffer value to the time threshold to determine if the time buffer value is less than the time threshold. If the vehicle computing system determines that the time buffer value is equal to or greater than the time threshold, then the vehicle computing system may determine that the vehicle will not collide with the agent and/or determine not to yield to the agent. However, if the vehicle computing system determines that the time buffer value is less than the time threshold, then the vehicle computing system may determine that there is at least some likelihood that the vehicle and the agent may collide in the region. In response to either such determination, the vehicle compute system may perform various actions to guarantee the safety of the pedestrian while continuing along a desired route.

Additionally or alternatively, after determining the distance threshold, the vehicle computing system may compare the distance buffer value to the distance threshold to determine if the distance buffer value is less than the distance threshold. If the vehicle computing system determines that the distance buffer value is equal to greater than the distance threshold, then the vehicle computing system may determine that the vehicle will not collide with the agent and/or determine not to yield to the agent. However, if the vehicle computing system determines that the distance buffer value is less than the distance threshold, then the vehicle computing system may determine that there is at least some likelihood that the vehicle and the agent may collide in the region. Again, in response to either such determination, the vehicle compute system may perform various actions to guarantee the safety of the pedestrian while continuing along a desired route.

Based on a determination that the vehicle and the agent may collide in the region, or a probability associated therewith, the vehicle computing system may determine an action to perform. The actions may include yielding to the agent (e.g., slowing down or stopping) and/or changing a planned path associated with the vehicle (e.g., lane change right, lane change left, change planned path of vehicle within lane, drive on shoulder, etc.). In some examples, determining the action may include determining a safe stop position for the vehicle. In such examples, the safe stop position may include a position in which little or no risk or probability of collision may exist (e.g., before the starting end of the region). In various examples, the vehicle computing system may determine that changing the lane associated with the vehicle path may result in a reduced yield time. In such examples, the vehicle computing system may determine a second region and perform a second time-space overlap to determine an amount, if any, to yield to the agent based on the path change.

The techniques discussed herein may improve a functioning of a vehicle computing system in a number of ways. As mentioned above, the vehicle computing system processes agent trajectory data based on a center of an agent. In some examples, the vehicle computing system may determine whether a collision risk exists based on whether the agent trajectory comes within a threshold distance of the path polygon. If the agent trajectory is within the threshold distance of the path polygon, the vehicle computing system may perform additional calculations to determine whether the collision risk exits. However, if the agent trajectory is not within the threshold distance, the vehicle computing system may avoid performing the additional calculations, thereby increasing the computing power available for other computations and improving the functioning of the computing device. Additionally, or in the alternative, the vehicle computing system may apply compression techniques to the path polygon of the vehicle. The compression techniques may reduce a number of points in the path polygon, thereby reducing a number of calculations that need to be computed to determine whether a collision risk exists. These and other improvements to the functioning of the computer are discussed herein and may, in some instances, be achieved using the techniques described herein.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1A is an illustration of an autonomous (or semi-autonomous) vehicle 102 in an environment 100, wherein a point path polygon 104 (path polygon 104) of the autonomous vehicle 102 and estimated agent trajectories 106(1)-(3) (also referred to as "trajectories 106") are overlaid in the illustration representing a two-dimensional map 108 of the environment 100 generated by an improved collision avoidance system of the autonomous vehicle 102 (vehicle 102). A vehicle computing system may perform the improved collision avoidance system of the vehicle 102. While described as a separate system, in some examples, the collision avoidance techniques described herein may be implemented by other vehicle systems, components, and/or computing devices. For example, and as will be described in further detail with regard to FIG. 6, the collision avoidance techniques described herein may be implemented at least partially by or in associated with a planning component 624.

In various examples, the vehicle computing system may generate the path polygon 104 of the vehicle 102. The path polygon 104 may be defined by a plurality of points 110(1)-(N) (also referred to as "points 110") (although only two are labeled for clarity reasons) and may represent a two-dimensional representation of a planned path of the vehicle 102 through the environment 100. In various examples, the path polygon 104 may be represented as pairs of points 110, though any number of individual points are contemplated. In some examples, the path polygon 104 may comprise a region formed by connecting individual points of the pairs of points 110 to define a perimeter of the path polygon 104. The pairs of points 110 may represent a left boundary and a right boundary of the vehicle 102. In some examples, the left and right boundaries of the vehicle may represent a minimum distance, such as, for example, a width of the vehicle 102. For example, the left and right boundaries may represent a left and right outermost edge of the vehicle, respectively. In some examples, the left and right boundaries (e.g., minimum distance) may additionally include a path buffer outside the outermost edge of the vehicle. For example, a left point 110(1) of a point pair may represent a left outermost boundary of the vehicle 102 plus 3 inches, 6 inches, 8 inches, or the like, and a right point 110(N) of the point pair may represent a right outermost boundary of the vehicle 102 plus 3 inches, 6 inches, 8 inches, or the like. The example path buffer distances in this example are for illustrative purposes only and may include any distance less than or greater than the distances listed. The path buffer on the left side and the right side may be the same or different. A length of the polygon may be associated with a time horizon. For example, trajectories may be calculated in accordance with a receding horizon technique. Lengths of associated polygons may be associated with such a receding horizon.

In various examples, a position of the left and right points 110 of a point pair may be individually adjusted based on a maneuver of the vehicle 102, such as, for example a turn. In such examples, a left point, such as left point 110(1) or right point, such as right point 110(N) of the point pair may be adjusted outward a distance (e.g., 3 inches, 5 inches, 8 inches, etc.) based on the maneuver. In various examples, the left or the right points 110 may be adjusted outward the distance based on a radius of curvature associated with a turn. For example, in a 45-degree right turn, a right point 110 of the point pair may be adjusted outward a distance to account for an additional space the vehicle 102 may occupy as the vehicle 102 travels through the turn.

In various examples, the pairs of points 110 may be represented on the map 108 at consistent intervals with respect to time (e.g., 0.2 second intervals, 0.5 second intervals, etc.). In some examples, the pairs of points 110 may be represented on the map 108 at varying intervals. In various examples, the pairs of points 110 may be represented at equal distances in length (e.g., length along the path) from one another. In such examples, each left/right point 110 of a point pair may be at a pre-defined distance (e.g., 1 meter, 3 feet, 18 inches, etc.) from the next left/right point 110 of the point pair. In some examples, the pairs of points 110 may be represented at different distances in length from one another. In various examples, the distances may be determined based on a maneuver of the vehicle 102, a speed of the vehicle 102, a density of traffic in the environment 100, and/or other factors impacting the vehicle 102.

In various examples, the vehicle computing system may be configured to detect one or more agents 112(1)-(2) (also referred to as "agents 112") in the environment 100. The vehicle computing system may detect the agent(s) 112 based on sensor data received from one or more sensors. In some examples, the sensor(s) may include sensors mounted on the vehicle 102, such as, for examples, cameras, motion detectors, LIDAR, RADAR, etc. In some examples, the sensor(s) may include one or more remote sensors, such as, for example sensors mounted on another vehicle (not illustrated) and/or sensors 114(1)-(2) mounted in the environment 100. In various examples, vehicle 102 may be configured to transmit and/or receive data from another vehicle and/or the sensors 114(1)-(2).

In various examples, the vehicle computing system may receive the sensor data and may determine a type of agent 112 (e.g., classify the type of agent), such as, for example, whether the agent 112 is a pedestrian, such as the agents 112, truck, motorcycle, moped, bicyclist, car, or the like. In various examples, the vehicle computing system may determine one or more agent polygons based on the sensor data and/or the type of agent 112. In such examples, the agent polygon(s) may represent one or more possible paths that the agent may travel through the environment 100. In various examples, the vehicle computing system may determine one or more estimated agent trajectories 106 based on the sensor data and/or the type of agent 112. In some examples, the trajectories 106 may include any number of possible paths in which the agents 112 may travel from a current position (e.g., at the time of perception) and/or based on a direction of travel. In the illustrative example, the agent 112(1) may continue straight in a first trajectory 106(1), may turn outside of the crosswalk 116 in a second trajectory 106(2), and/or may travel along one or more other trajectories. In some examples, the number of trajectories may vary depending on a variety of factors, such as the classification of the agent (e.g., type of agent), other stationary and/or dynamic objects, drivable surfaces, etc.

In various examples, the trajectories 106 may include trajectory samples 118(1)-(3) (also referred to as "trajectory samples 118"), such as first trajectory samples 118(1) (although only one is labeled for clarify reasons) for the first trajectory 106(1), second trajectory samples 118(2) (although only one is labeled for clarify reasons) for the second trajectory 106(2), and third trajectory samples 118(3) (although only one is labeled for clarify reasons) for the third trajectory 106(3). In some examples, the trajectory samples 118 may represent average positions of the agents 112 over time along the trajectories 106. In the illustrative example, the trajectory samples 118 represent constant velocities of the agents 112 (e.g., substantially equally spaced apart). The constant velocities may be based on perceived velocities, a known speed limit, a known walking speed, or the like. In such examples, the trajectory samples 118 may be represented at substantially equal distances from one another. In some examples, the trajectory samples 118 may represent varied velocities, accelerations, and/or decelerations of the agents 112. In such examples, the varied velocities may be based on pre-defined velocities for maneuvers, such as, for example, slowing down. Additionally, in such examples, the trajectory samples 118 may be represented at varied distances from one another. In at least other examples, such trajectory samples 118 may be determined based on predicted motions of the agents 112 as determined by a prediction system.

The trajectory samples 118 may represent centers of the agents 112. The centers of the agents 112 may include estimated centers of mass, estimated center point of the agents, or the like. Based on the path polygon 104 of the vehicle 102 and the trajectories 106, the vehicle computing system may determine whether regions 120(1)-(2) (also referred to as "regions 120") may exist between the vehicle 102(1) and the agents 112. In some examples, the regions 120 may exist between the vehicle 102 and the agents 112 if the path polygon 104 and a trajectory 106, such as 106(1), intersect.

Additionally, the vehicle computing system may determine one or more contextual factors associated with the environment 100 for which the vehicle 102 is navigating. In some examples, the contextual factor(s) are identified based on the sensor data from the sensors of the vehicle 102. In some examples, the contextual factor(s) are identified based on the sensor data received from the sensors 114 (and/or derived data therefrom—e.g., lighting states of traffic lights, presence of objects, etc.). The vehicle control system may then further use the contextual factor(s) to determine the regions 120 for the agents 112. In some instances, the vehicle computing system uses the contextual factor(s) to determine at least starting ends 122(1)-(2) and ending ends 124(1)-(2) for the regions 120. In at least some examples, such contextual factors may be determined, for example, based at least in part on additional data. In one such example, various symbols in a map relative to a location of a vehicle may be used (e.g., positions of crosswalks, speed limits, positions of traffic lights, traffic signs stored in a map, etc.).

For a first example, the vehicle 102 may determine contextual factor(s) associated with the agent 112(1). The contextual factor(s) may indicate that the location of the agent 112(1) is within the crosswalk 116 if the agent 112(1) navigates along the trajectory 106(1) or that that the location of the agent 112(1) is between the vehicle 102 and a front end of the crosswalk 116 if the agent 112(1) navigates along the trajectory 106(2). As such, the vehicle computing system may determine a first region for the trajectory 106(1), where the first region includes a starting end located at the agent 112(1) position (and/or a threshold distance before the agent 112(1) position) and/or possible agent 102(1) position along the trajectory 106(1) and an ending end located at the agent 112(1) position (and/or threshold distance after the agent 112(1) position) and/or possible agent 102(1) position along the trajectory 106(1). The vehicle computing system may also determine a second region for the trajectory 106(2), where the second region includes a starting end located at a front end of the crosswalk 116 and an ending end located at the agent 112 position (and/or threshold distance after the agent 112(1) position) and/or possible agent 112(1) position along the trajectory 106(2).

In some instance, the vehicle computing system may then determine the region 120(1) using the first region and the second region. For instance, and in the example of FIG. 1A, the vehicle computing system may determine that the starting end 122(1) includes the closest starting end to the vehicle 102 from among the first region and the second region, which is at the agent 112(1) position (and/or a threshold distance before the agent 112(1) position) and/or possible agent 112(1) position along the trajectory 106(1). Additionally, the vehicle computing system may determine that the ending end 124(1) includes the farthest ending end to the vehicle 102 from among the first region and the second region, which is at the agent 112(1) position (and/or threshold distance after the agent 112(1) position) and/or possible agent 112(1) position along the trajectory 106(2).

For a second example, the vehicle 102 may determine contextual factor(s) associated with the agent 112(2). The contextual factor(s) may indicate that the location of the agent 112(2) is outside of any crosswalk as the agent 112(2) navigates along the trajectory 106(3). As such, the vehicle computing system may determine that the starting end 122(2) is located at the agent 112(2) position (and/or a threshold distance before the agent 112(2) position) and/or possible agent 112(2) position along the trajectory 106(3) and the ending end 124(2) is located at the agent 112(2) position (and/or threshold distance after the agent 112(2) position) and/or possible agent 112(2) position along the trajectory 106(2).

FIG. 1B is illustrations of example time-space overlaps of position cones associated with agent trajectories (e.g., 106(1)-(2)) and planned speeds of the vehicle 102 relative to the region 120(1), in which a collision avoidance system of the vehicle 102 may determine a potential collision between the vehicle 102 and the agent 112(1) based on the time-space overlap, in accordance with embodiments of the disclosure. FIG. 1B is an illustration of a time-space overlap in which the collision avoidance system may determine that a position cone associated with the agent 112(1) does not overlap with the vehicle 102 along the planned path.

In various examples, the vehicle computing system may determine the vehicle position cone 126 and the agent position cone 128. The vehicle position cone 126 may be determined based on probable velocities of the vehicle 102 along the planned path (e.g., path polygon) through the region 120(1). The agent position cone 128 may be determined based on probable velocities of the agent 112(1) along a trajectory, such as trajectory 106(1). In FIG. 1B, the probable velocities of the vehicle 102 and the agent 112(1) may be illustrated as a velocity-time graph 130.

In various examples, the probable velocities illustrated in the velocity-time graph 130 may be derived from probable accelerations (e.g., positive and negative accelerations) of the vehicle 102 and the agent 112(1), respectively. In at least some examples, the largest positive and negative accelerations are considered for each of the agent and the vehicle. In FIG. 1B, the probable accelerations may be illustrated as acceleration-time graph 132. The velocities and accelerations illustrated in the velocity-time graph 130 and the acceleration-time graph 132 are exaggerated for illustrative purposes and are not meant to be limiting in any way. In some examples, the velocity-time graph 130 and/or the acceleration-time graph 132 may be represented in logarithmic scale. Further, any behavior, whether aggressive, conservative, average, or otherwise may be modeled.

In the illustrative example in FIG. 1B, each of the vehicle 102 and the agent 112(1) have both positive accelerations 134(1) and 134(2) (also referred to as "positive accelerations 134") and negative accelerations 136(1) and 136(2) (also referred to as "negative accelerations 136"), respectively. The positive accelerations 134 may be based on a fast-behavioral model (e.g., aggressive behavior). The negative accelerations 136 may be based on a slow-behavioral model (e.g., conservative behavior). In the illustrative example, the positive accelerations 134 and the negative accelerations 136 assume constant acceleration based on a current velocity and/or a road speed (e.g., speed limit, maximum known speed in the environment, etc.). In other examples, the positive accelerations 134 and the negative accelerations 136 may include varying accelerations. In various examples, the potential conservative and/or aggressive behaviors may be determined based on an initial velocity, a baseline velocity, a speed limit in the environment or portion thereof, or the like. In some examples, the potential conservative and/or aggressive behaviors may be based at least in part on a type and/or classification of agent 112(1). For example, conservative and/or aggressive behaviors of a pedestrian agent will differ from those of a vehicle. For another example, conservative and/or aggressive behaviors of a sports car will differ from those associated with a tractor-trailer.

In various examples, the positive acceleration 134(1) associated with the agent 112(1) may be based on walking speeds. In some examples, the positive acceleration 134(1) may represent a maximum amount of positive acceleration probable in the environment. In various examples, the negative acceleration 136(2) associated with the agent 112(1) may represent a maximum amount of negative acceleration probable in the environment, such as that based on the initial velocity.

In various examples, the vehicle computing system may determine a maximum velocity 138(1) of the agent 112(1), a maximum velocity 138(2) of the vehicle 102, a minimum velocity 140(1) of the agent 112(1), and a minimum velocity 140(2) of the vehicle 102 over time, based at least in part on respective positive accelerations 134 and negative accelerations 136, as illustrated on the velocity-time graph 130. In at least some examples, such maximum velocities may be based at least in part on a classification of the object (e.g., a human is incapable of speeds over 20 mph). In various examples, the vehicle computing system may determine an entry time and an exit time associated with the vehicle 102 enter point, vehicle exit point, agent 112(1) enter point, and agent 112(1) exit point, which is discussed below with regard to FIG. 3.

As illustrated in the time-space overlap 142, the vehicle computing system may determine the agent position cone 128 and the vehicle position cone 126 respective to the region 120(1). The agent position cone 128 and the vehicle position cone 126 may be based on an agent enter time 144, an agent exit time 146, a vehicle enter time 148, and a vehicle exit time 150 with respect to the region 120(1). In various examples, the agent enter time 144 ($t_{Agent}$ Enter) and the vehicle enter time 148 ($t_{Vehicle}$ Enter) may be associated with respective maximum velocities 138(1) and 138(2). In such examples, the entry times into the region 120(1) may be associated with a most aggressive estimation of speed. In various examples, the agent exit time 146 ($t_{Agent}$ Exit) and the vehicle exit time 150 ($t_{Vehicle}$ Exit) may be associated with respective minimum velocities 140(1) and 140(2). In such examples, the exit times into the region 120(1) may be associated with a most conservative estimation of speed. By calculating the enter velocities using the aggressive model and the exit velocities using the conservative model, the collision avoidance system can conservatively expand the range of times that the agent and vehicle will be in the collision zone contemporaneously.

In the illustrative example of FIG. 1B, the vehicle computing system may determine, based on the time-space overlap 142, that no overlap between the vehicle position cone 126 and the agent position cone 128 exists in the region 120(1). In some examples, based on the lack of an overlap, the vehicle computing system may determine that a risk of collision in the region is low. In some example, based on the lack of overlap, the vehicle computing system may determine a time buffer value 152 and/or a distance buffer value 154. As shown, the time buffer value 152 may include the shortest difference in time between when the vehicle 102 is located within the region 120(1) and the agent 112(1) is located within the collision zone 120(1). In some instances, the time buffer value 152 may include, but is not limited to, milliseconds, seconds, and/or the like. Additionally, the distance buffer value 154 may include the shortest distance between the vehicle 102 and the region 120(1) when the agent 112(1) is located within the region 120(1) and/or the agent 112(1) and the region 120(1) when the vehicle 102 is located within the region 120(1). In some instances, the distance buffer value 154 may include, but is not limited to, feet, meters, and/or the like.

The vehicle computing system may also determine, using one or more factor values, a time threshold and/or distance threshold associated with the region 120(1). The one or more factor values may include, but are not limited to, a base factor value, a hysteresis factor value, a comfort factor value, an assertiveness factor value, a velocity of the vehicle 102, and/or the like. For example, the vehicle computing system may determine the time threshold by the following equation:

$$\text{Time Threshold} = BF_1(V) + HF_1(V) + CF_1(AF_1) \qquad (1)$$

In equation (1), $BF_1$ is the base factor value for the time threshold, $HF_1$ is the hysteresis factor value for the time threshold, $V$ is the velocity of the vehicle 102, $CF_1$ is the comfort factor value for the time threshold, and $AF_1$ is the assertiveness factor value for the time threshold. The base factor value is velocity dependent and may represent a safety factor value that allows the vehicle 102 to stop a safe distance from the agent 112(1). The base factor value may include a time in milliseconds, seconds, and/or the like. For example, the base factor value may include, but is not limited to, 0.25 seconds, 0.5 seconds, 1 second, and/or any other time period. In some instances, the base factor value allows the vehicle 102 to safely stop using a comfortable deceleration, such as, but not limited to, $$-2\frac{m}{s^2}, -4\frac{m}{s^2}, -6\frac{m}{s^2},$$

and/or the like.

In some instance, the vehicle computing devices uses a table to determine the base factor value. For example, the table may associate different velocities of the vehicle 102 with different values of the base factor values. As such, the vehicle computing system may determine the base factor value using the velocity of the vehicle 102. In some instances, the base factor values are based at least in part on the vehicle deceleration constraints, system latency, and/or average pedestrian velocity/acceleration constraints.

The hysteresis factor value is also velocity dependent. The hysteresis factor value may include a time in milliseconds, seconds, and/or the like. For example, the hysteresis factor value may include, but is not limited to, 0.25 seconds, 0.5 seconds, 1 second, and/or any other time period. In some instance, if the vehicle 102 is stopped, then the hysteresis factor value is greater than zero. This is based on the assumption that, once the vehicle 102 is stopped, the agent 112(1) will begin traveling since the vehicle 102 is yielding to the agent 112(1). However, if the vehicle 102 is not currently stopped, then the hysteresis factor value may include zero.

In some instances, the hysteresis factor may also be based on whether the vehicle 102 has previously determined to deaccelerate and/or stop for the agent 112(1). For instance, the hysteresis factor may increase if the vehicle has previously determined to deaccelerate and/or stop for the agent 112(1).

The comfort factor value may be used to add additional time to the time threshold in order to be polite to agents that cross in front of the vehicle 102. The comfort factor value may include a time in milliseconds, seconds, and/or the like. For example, the comfort factor value may include, but is not limited to, 0.25 seconds, 0.5 seconds, 1 second, and/or any other time period. In some instances, the comfort factor value is based on the velocity of the vehicle 102. In such instances, the comfort factor value may decrease as the velocity of the vehicle 102 increases. For instance, the comfort factor may include a first value when the vehicle 102 is traveling a first velocity and include a second, lower value when the vehicle is traveling a second, faster velocity. In some instances, the comfort factor value may be zero when determining the time threshold.

The assertiveness factor value may be based on how assertive the vehicle 102 will be while navigating through the region 120(1). The assertiveness factor value may include a time in milliseconds, seconds, and/or the like. For example, the assertiveness factor value may include, but is not limited to, 0.25 seconds, 0.5 seconds, 1 second, and/or any other time period.

In some instances, the assertiveness factor value is between 0 and 1. For example, the assertiveness factor value may include 1 when the vehicle 102 is being the most assertive and 0 when the vehicle 102 is being the least assertive. In some instance, when the assertiveness factor value is 0, the vehicle 102 may allow for a higher maximum deceleration $$\left(\text{e.g.,} -4\frac{m}{s^2}\right).$$

In some instances, when the assertiveness factor value is near the middle, such as 0.5, the vehicle 102 may allow for more comfortable maximum deceleration $$\left(\text{e.g.}, -2.5\frac{m}{s^2}\right).$$

In some instances, the maximum allowed deceleration is inversely proportional to the assertiveness factor value. In some instances, the assertiveness factor value is based on if the vehicle 102 is currently blocking cross-traffic, how long the vehicle 102 has been blocking cross-traffic, if the vehicle 102 is in a junction, how long the vehicle 102 has been in a junction, and/or if the vehicle 102 is currently yielding to the agent 112(1).

In some instances, one or more of the factor values may be provided more weight when determining the time threshold. For example, $BF_1(V)$ may be multiplied by a first weight, $HF_1(V)$ may be multiplied by a second weight, and/or $PF_1(AF_1)$ may be multiplied by a third weight. A weight may include, but is not limited to, 0.5, 1, 2, 3, and/or any other number. In some instances, the first weight is greater than the second weight and/or the third weight. In some instances, one or more of the weights may be similar. In other instances, each of the weights may include a different number.

In some instances, the vehicle computing system may increase one or more of the weights in order to determine an increased time threshold that is greater than the original time threshold. The vehicle computing system may then use the increased time threshold to determine whether to decrease the velocity of the vehicle while approaching the region 120(1). For instance, if the vehicle determines that the time buffer value 152 is equal to or greater than the original time threshold, then the vehicle computing system may determine not to yield to the agent 112(1) within the region 120(1). However, if the vehicle computing system determines that the time buffer value 152 is less than the increased time threshold, then the vehicle computing system may determine to decrease the velocity of the vehicle 102 when approaching the region 120(1).

Additionally, the vehicle computing system may determine the distance threshold by the following equation:

$$\text{Distance Threshold} = BF_2(V) + HF_2(V) + CF_2(AF_2) \quad (2)$$

In equation (2), $BF_2$ is the base factor value for the distance threshold, $HF_2$ is the hysteresis factor value for the distance threshold, V is the velocity of the vehicle 102, $CF_2$ is the comfort factor for the distance threshold, and $AF_2$ is the assertiveness factor value for the distance threshold. The base factor is velocity dependent and may represent a safety factor that allows the vehicle 102 value to stop a safe distance from the agent 112(1). The base factor value may include a distance in feet, a distance in meters, a distance in miles, and/or the like. For example, the base factor value may include, but is not limited to, 0.5 meters, 1 meter, 5 meters, and/or any other distance. In some instances, the base factor value allows the vehicle 102 to safely stop using a comfortable deceleration, such as, but not limited to, $$2\frac{m}{s^2}, 4\frac{m}{s^2}, 6\frac{m}{s^2},$$

and/or the like.

In some instance, the vehicle computing devices uses a table to determine the base factor value. For example, the table may associate different velocities of the vehicle 102 with different values of the base factor value. As such, the vehicle computing system may determine the base factor value using the velocity of the vehicle 102. In some instances, the base factor values are based at least in part on the vehicle deceleration constraints, system latency, and/or average pedestrian velocity/acceleration constraints.

The hysteresis factor value is also velocity dependent. The hysteresis factor value may include a distance in feet, a distance in meters, a distance in miles, and/or the like. For example, the hysteresis factor value may include, but is not limited to, 0.5 meters, 1 meter, 5 meters, and/or any other distance. In some instance, if the vehicle 102 is stopped, then the hysteresis factor value is greater than zero. This is based on the assumption that, once the vehicle 102 is stopped, the agent 112(1) will begin traveling since the vehicle 102 is yielding to the agent 112(1). In some instances, the base factor value is also zero even when the vehicle is moving. However, if the vehicle 102 is not currently stopped, then the hysteresis factor value may be zero.

In some instances, the hysteresis factor may also be based on whether the vehicle 102 has previously determined to deaccelerate and/or stop for the agent 112(1). For instance, the hysteresis factor may increase if the vehicle has previously determined to deaccelerate and/or stop for the agent 112(1).

The comfort factor value may be used to add additional time to the time threshold in order to be polite to agents that cross in front of the vehicle 102. The comfort factor value may include a distance in feet, a distance in meters, a distance in miles, and/or the like. For example, the comfort factor value may include, but is not limited to, 0.5 meters, 1 meter, 5 meters, and/or any other distance. In some instances, the comfort factor value is based on the velocity of the vehicle 102. In such instances, the comfort factor value may decrease as the velocity of the vehicle 102 increases. For instance, the comfort factor may include a first value when the vehicle 102 is traveling a first velocity and include a second, lower value when the vehicle is traveling a second, faster velocity.

The assertiveness factor value may be based on how assertive the vehicle 102 will be while navigating through the region 120(1). The assertiveness factor value may include a distance in feet, a distance in meters and/or the like. For example, the assertiveness factor value may include, but is not limited to, 0.5 meters, 1 meter, 5 meters, and/or any other distance.

In some instances, the assertiveness factor value is between 0 and 1. For example, the assertiveness factor value may include 1 when the vehicle 102 is being the most assertive and 0 when the vehicle 102 is being the least assertive. In some instance, when the assertiveness factor value is 0, the vehicle 102 may allow for a higher maximum deceleration $$\left(\text{e.g.}, -4\frac{m}{s^2}\right).$$

In some instances, when the assertiveness factor value is near the middle, such as 0.5, the vehicle 102 may allow for more comfortable maximum deceleration $$\left(\text{e.g.,} -2.5\frac{m}{s^2}\right).$$

In some instances, the maximum allowed deceleration is inversely proportional to the assertiveness factor value. In some instances, the assertiveness factor value is based on if the vehicle 102 is currently blocking cross-traffic, how long the vehicle 102 has been blocking cross-traffic, if the vehicle 102 is in a junction, how long the vehicle 102 has been in a junction, and/or if the vehicle 102 is currently yielding to the agent 112(1).

In some instances, one or more of the factor values may be provided more weight when determining the distance threshold. For example, $BF_2(V)$ may be multiplied by a first weight, $HF_2(V)$ may be multiplied by a second weight, and/or $PF_2(AF_2)$ may be multiplied by a third weight. A weight may include, but is not limited to, 0.5, 1, 2, 3, and/or any other number. In some instances, the first weight is greater than the second weight and/or the third weight. In some instances, one or more of the weights may be similar to one another. In other instances, each of the weights may be different from one another.

In some instances, the vehicle computing system may increase one or more of the weights in order to determine an increased distance threshold that is greater than the original distance threshold. The vehicle computing system may then use the increased distance threshold to determine whether to decrease the velocity of the vehicle while approaching the region 120(1). For instance, if the vehicle determines that the time buffer value 152 is equal to or greater than the original distance threshold, then the vehicle computing system may determine not to yield to the agent 112(1) within the region 120(1). However, if the vehicle computing system determines that the time buffer value 152 is less than the increased distance threshold, then the vehicle computing system may determine to decrease the velocity of the vehicle 102 when approaching the region 120(1).

For a first example of using the equations above, the vehicle 102 may be traveling at 10 miles per hour and approaching the crosswalk 116, where the vehicle 102 is able to comfortably brake for the agent 112(1). In such an example, the safety factor value for the time threshold may include 0.52 seconds and the safety term for the distance threshold may include 0.52 meters. Additionally, the comfort factor value for the time threshold may include 4 seconds and the comfort factor value for the distance threshold may include 3 meters. This is because the vehicle 102 wants to be polite and not block traffic. As such, and using the equations above, the time threshold may include 4.52 seconds and the distance threshold may include 3.52 meters.

For a second example of using the equations above, the vehicle 102 may be traveling at 20 miles per hour and approaching the crosswalk 116, where the vehicle 102 is able to comfortably brake for the 3.82 meters.

For a third example of using the equations above, the vehicle 102 may be stopped before the crosswalk 116, where the vehicle 102 has been stopped for a few seconds and blocking an intersection. In such an example, the safety factor value for the time threshold may include 0.25 seconds and the safety term for the distance threshold may include 0.25 meters. Additionally, the hysteresis factor value for the time threshold may include 0.25 seconds and the hysteresis factor value for the distance threshold may include 0 meters. This is because the vehicle 102 has been stopped for a few seconds. Furthermore, the comfort factor value for the time threshold may include 0 seconds and the comfort factor value for the distance threshold may include 0 meters. This is because the vehicle 102 wants to stop blocking traffic. As such, and using the equations above, the time threshold may include 0.5 seconds and the distance threshold may include 0.25 meters.

After determining the time threshold, the vehicle computing system may compare the time buffer value 152 to the time threshold to determine if the time buffer value 152 is equal to or greater than the time threshold. If the vehicle computing system determines that the time buffer value 152 is equal to or greater than the time threshold, then the vehicle computing system may determine that the vehicle 102 will not collide with the agent 112(1) and/or determine not to yield to the agent 112(1). However, if the vehicle computing system determines that the time buffer value 152 is less than the time threshold, then the vehicle computing system may determine that the vehicle 102 and the agent may collide in the region 120(1).

Additionally, after determining the distance threshold, the vehicle computing system may compare the distance buffer value 154 to the distance threshold to determine if the distance buffer value 154 is equal to or greater than the distance threshold. If the vehicle computing system determines that the distance buffer value 154 is equal to or greater than the distance threshold, then the vehicle computing system may determine that the vehicle 102 will not collide with the agent 112(1) and/or determine not to yield to the agent 112(1). However, if the vehicle computing system determines that the distance buffer value 154 is less than the distance threshold, then the vehicle computing system may determine that the vehicle 102 and the agent may collide in the region 120(1).

Based on a determination that the vehicle 102 and the agent 112(1) may collide in the region 120(1), the vehicle computing system may determine an action to perform. The actions may include yielding to the agent 112(1) (e.g., slowing down or stopping), and/or changing a planned path associated with the vehicle 102 (e.g., lane change right, lane change left, change planned path of vehicle within lane, drive on shoulder, etc.). In some examples, determining the action may include determining a safe stop position for the vehicle 102. In such examples, the safe stop position may include a position in which little or no risk or probability of collision may exist (e.g., the starting end 122(1) of the region 120(1)). In various examples, the vehicle computing system may determine that changing the lane associated with the vehicle 102 path may result in a reduced yield time. In such examples, the vehicle computing system may determine a second collision zone and perform a second time-space overlap to determine an amount, if any, to yield to the agent based on the path change.

In some instances, the vehicle computing system may determine an increased time buffer value 152 and/or distance buffer value 154. For example, the vehicle computing system may determine the increased time buffer value 152 by the following equation:

$$\text{Increased Time Buffer} = k_1 \times \max(vttc - c_1, 0) \qquad (3)$$

In the above equation, the vttc may include the nominal time that the vehicle 102 will occupy the region 120(1). In some instance, the vehicle computing system uses the median of the time that the agent 112(1) is predicted to be located within the region 120(1). However, in other instances, the vehicle computing system may use some other time.

The $k_1$ may include a first factor value that is used to scale the increased time buffer for any uncertainty in the predicted trajectories of the vehicle 102 and/or the agent 112(1). In some instance, the first facture value may include a 0.5, 1, 2, 5, and/or any other number.

Additionally, $c_1$ may include a second factor value representing predicted times for which the vehicle 102 will enter/exit the region 120(1). In some instances, the second factor value is based on when the front of the vehicle 102 enters the region 120(1) to when the rear of the vehicle 102 exits the region 120(1).

For a second example, the vehicle computing system may determine the increased distance buffer value 154 by the following equation:

$$\text{Inreased Distance Buffer} = k_2 \times \max(vttc - c_2, 0) \quad (3)$$

In the above equation, the vttc may include the nominal time that the vehicle 102 will occupy the region 120(1). In some instance, the vehicle computing system uses the median of the time that the agent 112(1) is predicted to be located within the region 120(1). However, in other instances, the vehicle computing system may use some other time.

The $k_2$ may include a first factor value that is used to scale the increased time buffer for any uncertainty in the predicted trajectories of the vehicle 102 and/or the agent 112(1). In some instance, the first facture value may include a 0.5, 1, 2, 5, and/or any other number.

Additionally, $c_2$ may include a second factor value representing predicted times for which the vehicle 102 will enter/exit the region 120(1). In some instances, the second factor value is based on when the front of the vehicle 102 enters the region 120(1) to when the rear of the vehicle 102 exits the region 120(1).

Figure 2:
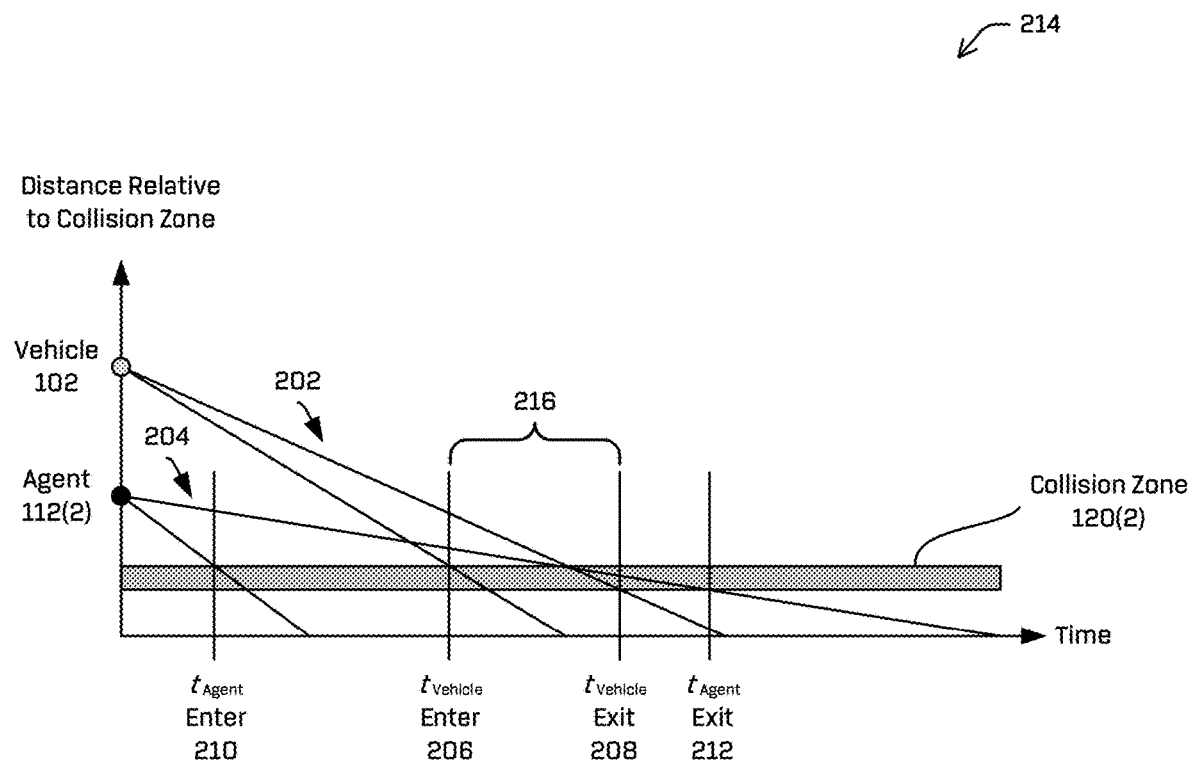
FIG. 2 is an illustration of another example of a time-space overlap of position cones associated with agent trajectories and planned speeds of an autonomous vehicle relative to a region, in which a collision avoidance system of the autonomous vehicle may determine a potential collision between the autonomous vehicle and an agent based on the time-space overlap, in accordance with embodiments of the disclosure.

FIG. 2 illustrations of example time-space overlaps of position cones associated with the trajectory 106(3) of the agent 112(2) and planned speeds of the vehicle 102 relative to the region 120(2), in which a collision avoidance system of the vehicle 102 may determine a potential collision between the vehicle 102 and the agent 112(2) based on the time-space overlap, in accordance with embodiments of the disclosure. FIG. 2 is an illustration of a time-space overlap in which the collision avoidance system may determine a high risk of collision between the vehicle 102 and the agent 112(2) based on a position cone associated with the agent 112(2) overlapping with the vehicle 102 along the planned path.

Similar to the process described in FIG. 1B, the vehicle computing system may derive maximum and minimum velocities associated with the vehicle 102 and the agent 112(2) based on conservative and aggressive accelerations, object classifications, and the like. The vehicle computing system may then determine a vehicle position cone 202 and an agent position cone 204. Additionally, the vehicle computing system may determine times associated with entry and exit points for the vehicle 102 (e.g., vehicle enter time 206 ($t_{Vehicle}$ Enter) and the vehicle exit time 208 ($t_{Vehicle}$ Exit)) and the agent 112(2) (e.g., agent enter time 210 ($t_{Agent}$ Enter) and the agent exit time 212 ($t_{Agent}$ Exit)) based on the derived velocities.

FIG. 2 is an illustration of a time-space overlap 214 in which the collision avoidance system may determine a high risk of collision between the vehicle 102 and the agent 112(2) based on the agent position cone 204 associated with the agent 112(2) overlapping with the vehicle position cone 202 associated with the vehicle 102 along a planned path (e.g., path polygon). A risk and/or probability of collision may be determined based on an amount of overlap (e.g., time gap) between the vehicle position cone 202 and the agent position cone 204. A high risk (e.g., probability) of collision may include a probability of collision above a first threshold (e.g., 25%, 30%, 40%, etc.). A low risk of collision may include a probability of collision below a second threshold (e.g., 5%, 7%, 10%, etc.). A medium risk of collision may include a probability of collision between the first and second thresholds. In the illustrative example, the time-space overlap 214 includes a graphical representation of a distance relative to the region 120(1) versus time.

In the illustrative example of FIG. 2, the vehicle computing system may determine, on the time-space overlap 214, that an overlap 216 between the vehicle 102 and the agent 112(2) exists in the region 120(2). Based on the overlap 216, the vehicle computing system may determine that a risk of collision in the region 120(2) is high and that the vehicle computing system should cause the vehicle 102 to perform an action to avoid collision. The action may include slowing the vehicle 102 to yield to the agent 112(2), stopping the vehicle 102 to yield to the agent 112(2), changing lanes left, or changing lanes right. In some examples, determining the action may include determining a safe stop position for the vehicle 102. In such examples, the safe stop position may include a position in which little or no risk or probability of collision may exist. Based on the determined action, the vehicle computing system may cause the vehicle 102 to perform the action. In various examples, responsive to determining to adjust a lateral position of the vehicle 102, such as in a lane change to the left or to the right, the vehicle computing system may again generate a path polygon, plot agent trajectories with respect to the path polygon, determine regions, and perform a time-space overlap to determine whether a collision risk may still exist after the action.

Figure 3:
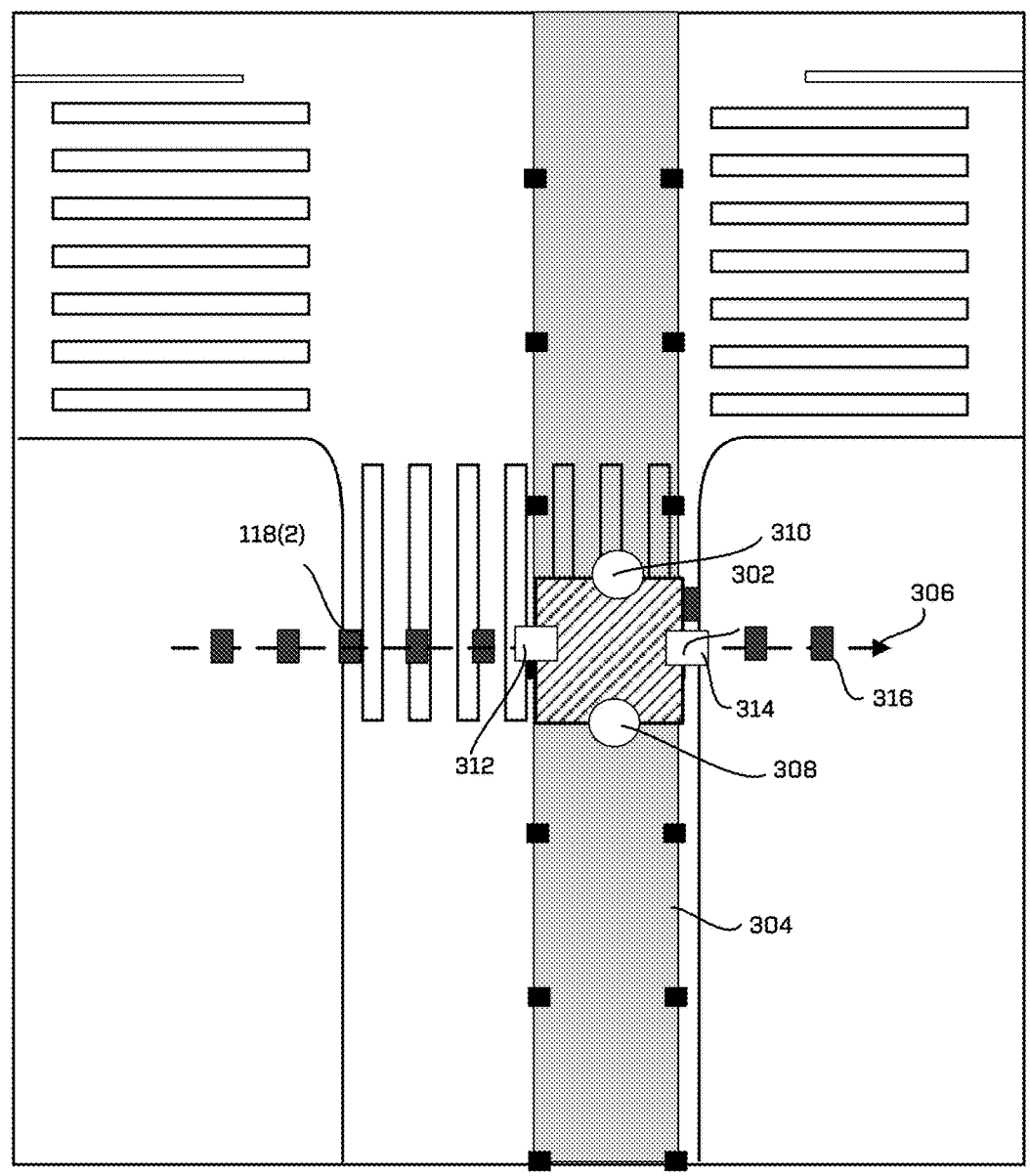
FIG. 3 is an illustration of an autonomous vehicle in an environment, in which a collision avoidance system of the autonomous vehicle may determine a region between a path polygon representing a planned path of the autonomous vehicle and an estimated agent trajectory associated with an agent.

FIG. 3 is an illustration of an environment 300, such as environment 100, wherein a collision avoidance system of the vehicle 102 may determine a region 302, such as the region 120(1), between a path polygon 304, such as the path polygon 104, representing a planned path of the vehicle 102 and an estimated agent trajectory 306, such as the trajectory 106(1), associated with an agent, such as the agent 112(1).

In various examples, the vehicle computing system of the vehicle 102 may be configured with the collision avoidance system which may determine the region 302. The region 302 may include four elements, a vehicle enter point 308, a vehicle exit point 310, an agent enter point 312, and an agent exit point 314. Each of the vehicle and agent enter and exit points may include a position and distance. The agent enter point 312 and agent exit point 314 may include trajectory samples 316, such as the trajectory samples 118(2), along the trajectory 306 of the agent. In some examples, the agent enter point 312 and the agent exit point 314 may represent trajectory samples 316 in which a risk of collision does not exist. In various examples, the agent enter point 312 position may be determined by identifying the last trajectory sample 316 prior to an intersection (e.g., convergence) with the path polygon 304. In some examples, the agent exit point 314 position may be determined by identifying the first trajectory sample 316 after the intersection between the trajectory 306 and the path polygon 304. The distance associated with the agent enter point 312 and the agent exit point 314 may be derived from the respective positions as a distance along the trajectory 306.

The vehicle computing system may determine the vehicle enter point 308 and the vehicle exit point 310 positions based on an offset distance before and after trajectory 306 (e.g., to the left and to the right of the trajectory 306). In some examples, the offset distance may be based on a width of the agent, the width of the agent plus a buffer, a buffer itself, or any other distance representative of a safe distance from the agent at which the vehicle 102 will not collide. In some examples, the offset distance may include a distance measured from the trajectory 306. In some examples, the offset distance may include a distance measured along the path polygon 304 (e.g., vehicle path) before and after the trajectory 306. In various examples, the offset distance may be measured from the center of the path polygon. In some examples, the offset distance may be measured from a forward most point of the vehicle 102 along the path polygon 304. In such examples, the offset distance may account for vehicle maneuvers (e.g., turns) and an affect thereof on a position of the vehicle 102.

In some examples, the offset distance may include a pre-defined distance (e.g., a constant distance) from the trajectory 306, such as, for example, based on a length of the vehicle 102. In various examples, the offset distance may be based on a known or perceived width of the agent and/or an agent buffer. In some examples, the offset distance before and after the trajectory may be the same or a different constant distance. For example, the vehicle enter point 308 may represent a position with a 10-foot offset distance before the trajectory 306 and the vehicle exit point 310 may represent a position with a 5-foot offset distance after the trajectory 306. For another example, the vehicle enter point 308 and the vehicle exit point 310 may represent positions with a 7-foot offset distance before and after the trajectory 306, respectively.

As discussed in detail above with respect to FIGS. 1B and 2, based on a determination of the bounds (e.g., agent enter point 312, agent exit point 314, vehicle enter point 308, vehicle exit point 310) of one or more regions 302 between the vehicle 102 and the agent, the vehicle computing system may apply a time-space overlap to each region 302 to determine a risk of collision in the region 302. The time-space overlap may include planned speeds associated with the vehicle and probable speeds associated with the agent. In some examples, the time-space overlap may be represented as a position cone of probable speeds at which the agent may travel through the environment 300 into and through the region 302. In some examples, the time-space overlap may be represented as one or more probability density functions (PDFs) associated with probable positions of the agent based on time.

Figure 4:
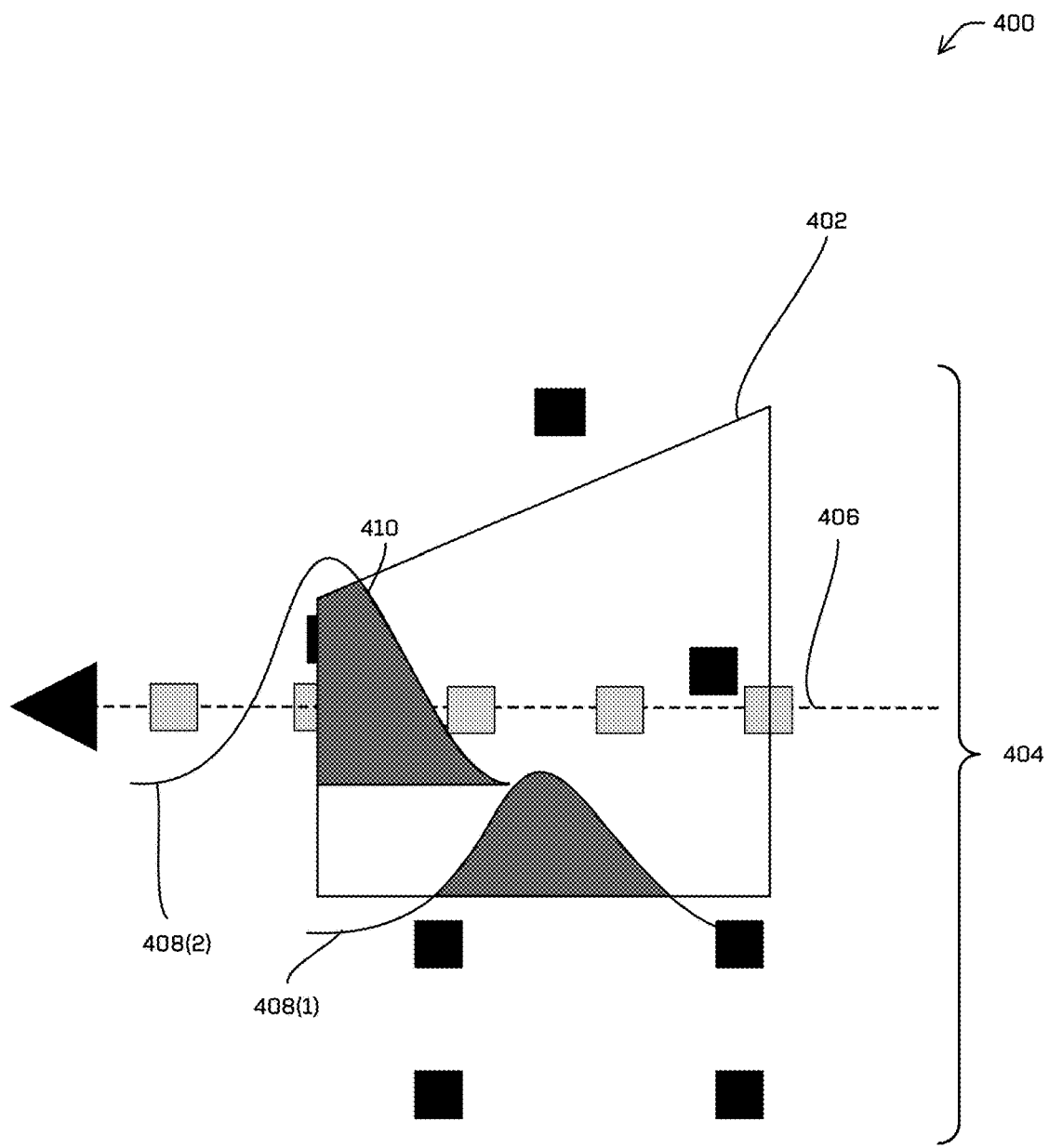
FIG. 4 is an illustration of a collision zone between a path polygon of an autonomous vehicle and an estimated agent trajectory, in which a collision avoidance system of the autonomous vehicle may determine a potential collision point between the autonomous vehicle and an agent based on one or more probability density functions of probable speeds and actions associated with the agent, in accordance with embodiments of the disclosure.

FIG. 4 is an illustration of a time-space overlap 400 (e.g., an overlap) on a region 402 between a path polygon 404, such as the path polygon 104, of a vehicle, such as the vehicle 102, and an estimated agent trajectory 406, such as the trajectory 106(1), wherein an improved collision avoidance system of the vehicle 102 may determine a risk of collision between the vehicle 102 and an agent (e.g., an object), such as agent 112(1), based on one or more probability density functions 408 of probable positions associated with the agent and/or the vehicle over time.

As discussed above, the vehicle computing system of the vehicle 102 may perform a time-space overlap 400 on a determined region 402 using the one or more probability density functions 408 (e.g., probability density functions 408(1)-(2)) associated with probable positions of the agent and/or the vehicle 102 based on time. The probable positions of the agent and/or the vehicle 102 may be derived from probable accelerations, and speeds derived therefrom. The probability density function(s) 408 may represent aggressive and conservative driving speeds, as well as uncertainties based on accelerations of the agent, such as those based on normal walking speeds, traffic laws, rules of the road, local driving etiquette, traffic patterns, semantic classification of the agent, or the like.

In the illustrative example, the probability density function(s) 408 are illustrated as two curves overlaid on the region 402. Probability density function 408(1) may represent probable positions of the vehicle 102, and probability density function 408(2) may represent probable positions of the agent, or vice versa. In some examples, one or more probability density functions 408 associated with each of the vehicle 102 and the agent may be convoluted into a single probability density function 408. In such examples, the probability density function 408 may represent a convolution of probable positions of both the agent and the vehicle 102, in a single distribution.

In various examples, the probability density function(s) 408 may represent a two-dimensional area associated with the agent and/or the vehicle 102. In some examples, the probability density function(s) 408 may represent a three-dimensional area associated with the agent and/or the area. In various examples, the total sum of the area under a curve (e.g., an integral) of a probability density function 408, such as probability density function 408(1) may equal 1. In some examples, the integral of the probability density function(s) 408 may be equal to the number of probability density functions 408. For example, in the illustrative example, the integral is equal to 2, representing the area under the curve of probability density function 408(1) and the area under the curve of probability density function 408(2).

In various examples, the vehicle computing system may determine whether some or all of at least one probability density function 408 are positioned within the region 402. In such examples, the probability density function(s) 408 may be positioned in the region 402 if at least part of the at least one probability density function 408 intersects and/or lays within the region 402. In the illustrative example, at least a portion of probability density functions 408(1) and 408(2) intersect with the region 402.

In various examples, based on a determination that the probability density function(s) 408 are positioned outside of and do not intersect with the region 402, the vehicle computing system may determine that a risk of collision and/or probability of collision between the vehicle 102 and the agent is low and/or does not exist. In some examples, based on a determination that at least a portion of one or more probability density functions 408 are positioned and/or intersect with the region 402, the vehicle computing system may determine an overlap 410. The overlap 410 may be representative of an area under each curve (e.g., an integral) of the probability density function(s) 408 that overlaps with the region 402.

In various examples, the vehicle computing system may determine a percentage of area of each probability density function 408 that intersects with the region 402. In such examples, the vehicle computing system may partition the overlap 410 based on an area under a curve associated with each probability density function 408(1) and 408(2). In some examples, the vehicle computing system may determine a percentage of area of the overlap 410 compared to a number of probability density functions 408. For example, the vehicle computing system may determine an area associated with the overlap 410 as a percentage of two (e.g., an area equivalent to one for each of the two probability density functions 408).

In various examples, the vehicle computing system may determine a risk and/or probability of collision based on the percentage of area under one or more probability density functions 408 that intersect with the region 402. In some examples, the risk and/or probability may be deemed high, medium, or low, based on the percentage of area. For example, less than a 15% area may be considered low risk, 16-30% area may be considered medium risk, and above 31% may be considered high risk.

In various examples, the vehicle computing system may determine whether the percentage of area under the curve(s) of the probability density function(s) 408 is less than a threshold percentage (e.g., 5%, 10%, 15%, 20%, etc.). In such examples, based on a determination that the percentage of area under the curve(s) of the probability density functions 408 is less than the threshold percentage, the vehicle computing system may determine that there is a low and/or no risk and/or probability of collision between the vehicle 102 and the agent. In some examples, the vehicle computing system may determine whether the percentage of area under the curve(s) of the probability density function(s) 408 is exceeds a threshold percentage (e.g., 25%, 50%, 75%, etc.). In such examples, based on a determination that the percentage of area under the curve(s) of the probability density functions 408 is greater than the threshold percentage, the vehicle computing system may determine that there is a high risk and/or probability of collision between the vehicle 102 and the agent. In various examples, a high risk and/or probability of collision may be a risk that exceeds an acceptable amount of risk.

In some examples, based on a determination of risk (e.g., high, medium, or low risk), the vehicle computing system may determine an action to take. The action may include slowing the vehicle 102 to yield to the agent, stopping the vehicle 102 to yield to the agent, changing lanes left, or changing lanes right. In some examples, determining the action may include determining a safe stop position for the vehicle 102. In such examples, the safe stop position may include a position in which little or no risk or probability of collision may exist. In at least some examples, the action may be based, at least in part, on the determined combined probability after integration. As a non-limiting example, a vehicle velocity may be adjusted as a function of probability of collision. Based on the determined action, and as will be discussed in further detail with respect to FIG. 5, the vehicle computing system may cause the vehicle 102 to perform the action. In various examples, responsive to determining to adjust a lateral position of the vehicle 102, such as in a lane change to the left or to the right, the vehicle computing system may again generate a path polygon, plot agent trajectories with respect to the path polygon, determine regions, and perform a time-space overlap to determine whether a collision risk may still exist after the action.

In various examples, the vehicle computing system may be configured to cause the vehicle 102 to perform the action based at least on a display of intent. The display of intent may represent a signal to agents and/or other vehicles in the environment of a follow-up action that the vehicle 102 will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk of collision. In such examples, the follow-up action may be chosen based on a determination of the very low or zero risk of collision. For example, the vehicle computing system may determine that the front-facing portion of the vehicle 102 may enter the region 402 in an intersection without risk of collision with the agent. The vehicle computing system may thus cause the vehicle 102 to enter the region 402 in the intersection to signal an intent to turn left in the intersection.

FIGS. 5A-5I are illustrations of generating regions based on locations of agents within a crosswalk. For instance, in the example of FIG. 5A, the vehicle 102 may determine that a location 502 of the agent is within a crosswalk 504 (e.g., between the front end 506 and the back end 508 of the crosswalk 504). As such, the vehicle 102 may determine a region 510 that includes a starting end 512 located at the front end 506 of the crosswalk 504 and an ending end 514 located at the location 502 of the agent and/or located a threshold distance past the location 502 of the agent.

Figure 5A:
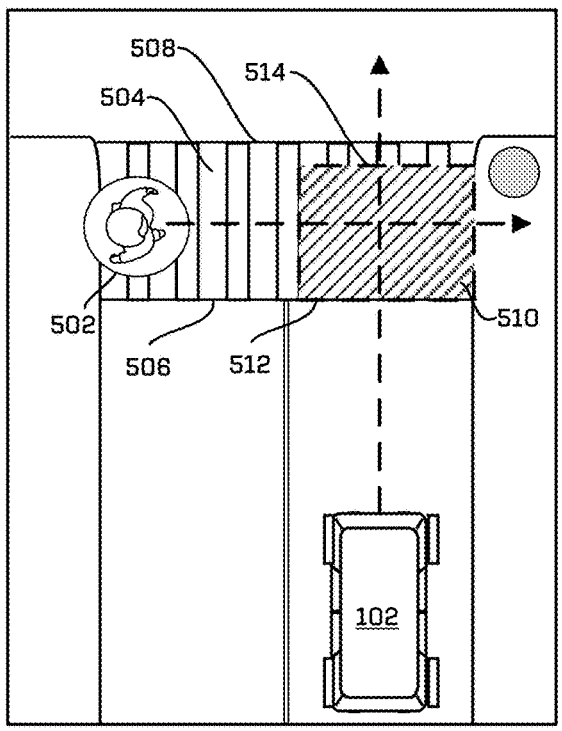
Figure 5B:
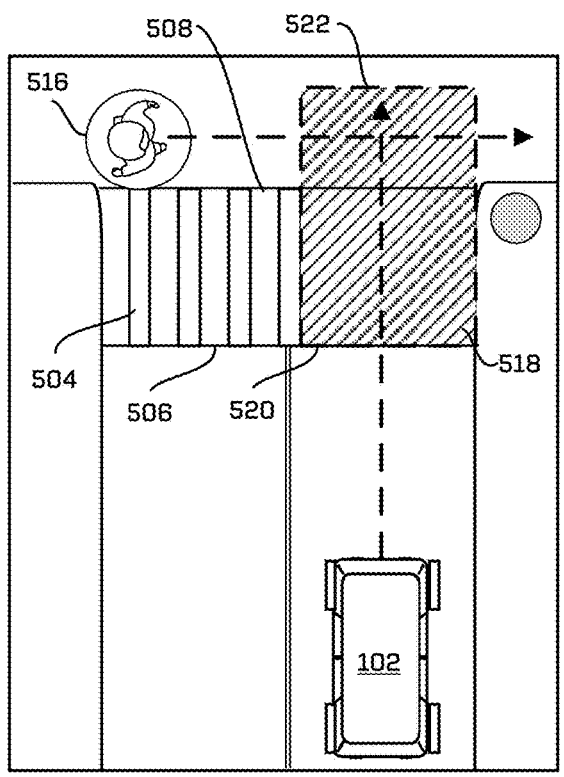

In the example of FIG. 5B, the vehicle 102 may determine that a location 516 of an agent is further from the back end 508 of the crosswalk 504 than the vehicle 102. As such, the vehicle 102 may determine a region 518 that includes a starting end 520 located at the front end 506 of the crosswalk 504 and an ending end 522 located at the location 516 of the agent and/or located a threshold distance past the location 522 of the agent.

Figure 5C:
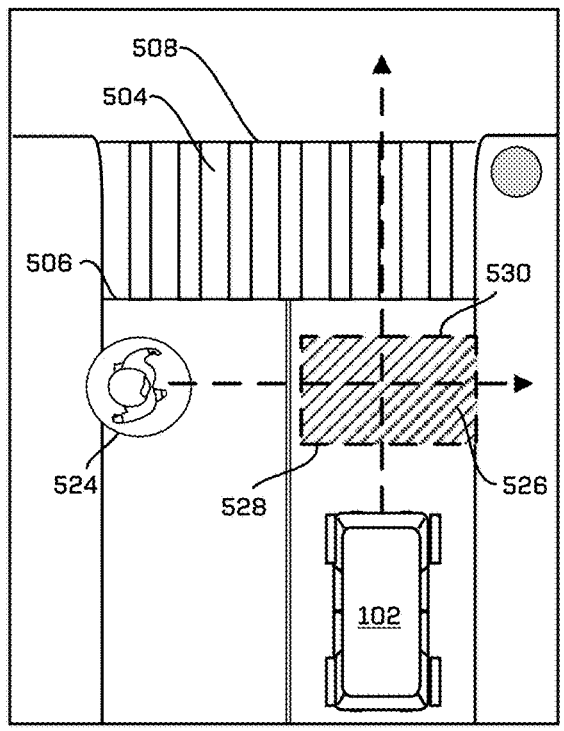

In the example of FIG. 5C, the vehicle 102 may determine that a location 524 of an agent is between the vehicle 102 and the front end 506 of the crosswalk 504. As such, the vehicle 102 may determine a region 526 that includes a starting end 528 located at the location 524 of the agent and/or a threshold distance before the location 524 of the agent, and an ending end 530 located at the location 524 of the agent and/or located a threshold distance past the location 530 of the agent.

Figure 5D:
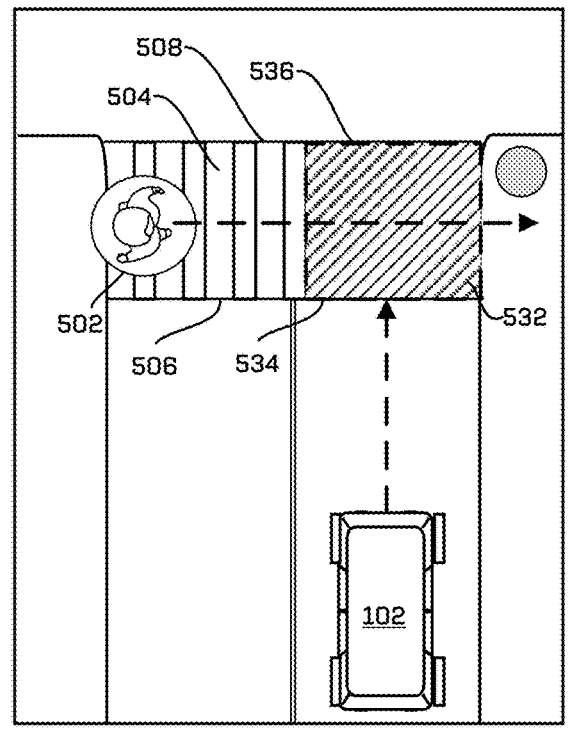

In the example of FIG. 5D, the vehicle 102 may determine that the vehicle 102 is approaching a junction and likely to stop within the crosswalk 504. This may be because of a traffic sign, such as a traffic light turning red. As such, the vehicle 102 may determine a region 532 that includes a starting end 534 located at the front end 506 of the crosswalk 504 and an ending end 536 located at the back end 508 of the crosswalk 504.

Figure 5E:
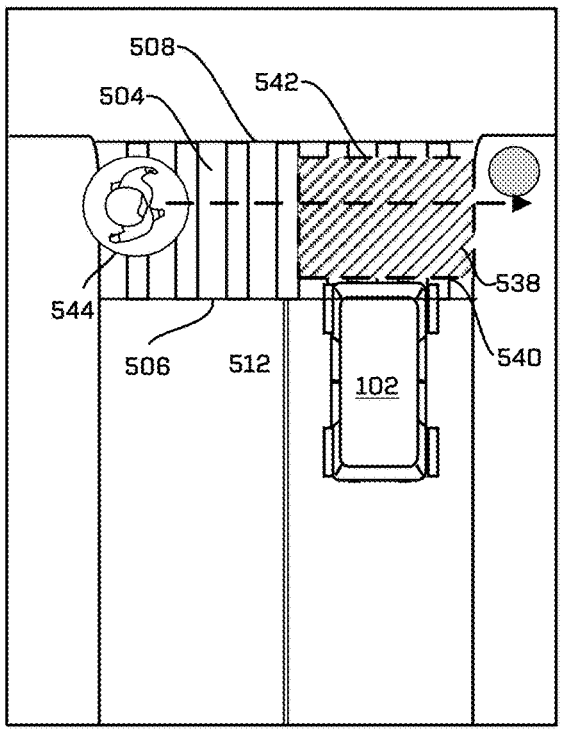

In the example of FIG. 5E, the vehicle 102 may determine that the vehicle 102 has stopped at least partly within the crosswalk 504. This may be because of a traffic sign, such as a traffic light turning red. As such, the vehicle 102 may determine a region 538 that includes a starting end 540 located at the end of the vehicle 102 (e.g., at the end of the front bumper) and an ending end 542 located at a location 544 of the agent and/or located a threshold distance past the location 544 of the agent.

Figure 5F:
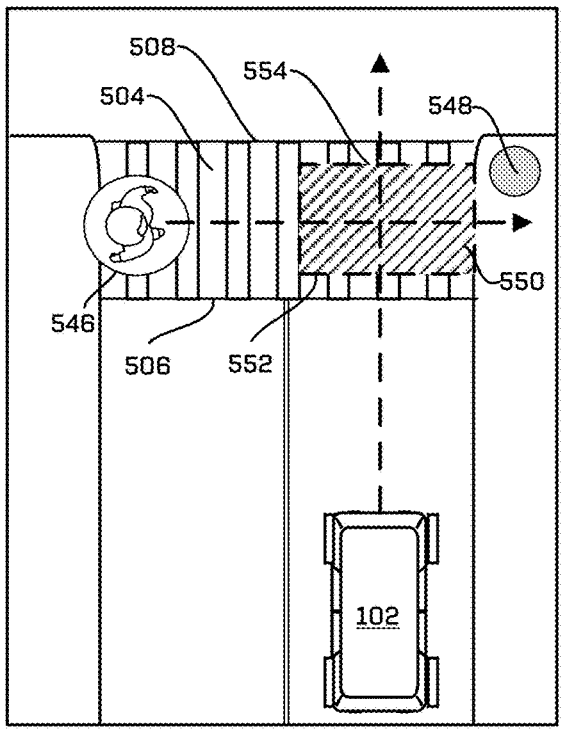

In the example of FIG. 5F, the vehicle 102 may determine that a location 546 of an agent is within the crosswalk 504, but the crosswalk 504 is in a non-crossable state. For instance, the vehicle 102 may determine that a traffic light for the vehicle 102 is green and/or a traffic sign 548 for the crosswalk 504 indicates no crossing. As such, the vehicle 102 may determine a region 550 that includes a starting end 552 located at the location 546 of the agent and/or within a threshold distance before the location 546 of the agent, and an ending end 554 located at the location 546 of the agent and/or located a threshold distance past the location 546 of the agent.

Figure 5G:
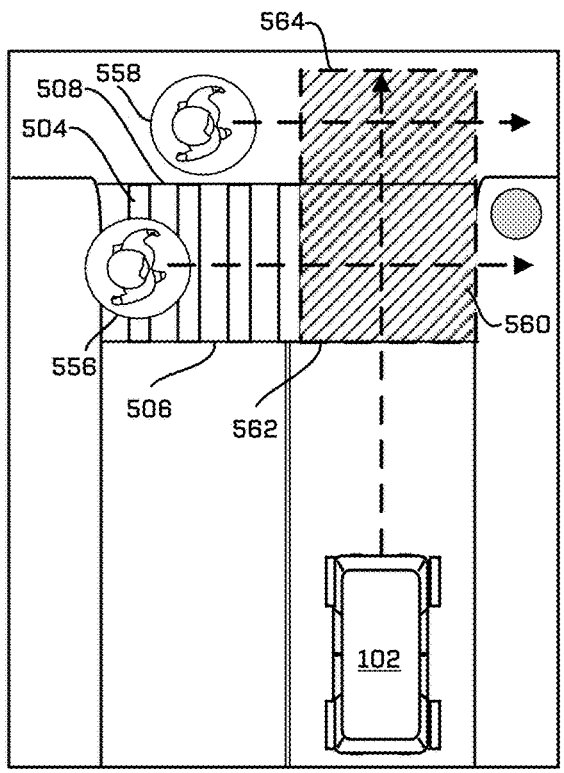

In the example of FIG. 5G, the vehicle 102 may determine that a first location 556 of a first agent is within the crosswalk 504 and a second location 558 of a second agent is further from the back end 508 of the crosswalk 504 than the vehicle 102. As such, the vehicle 102 may determine a first region for the first agent that includes a starting end located at the front end 506 of the crosswalk 504 and an ending end located at the first location 556 of the first agent and/or located a threshold distance past the first location 556 of the first agent. The vehicle 102 may further determine a second region for the second agent that includes a starting end located at the front end 506 of the crosswalk 504 and an ending end located at the second location 558 of the second agent and/or located a threshold distance past the second location 558 of the second agent.

The vehicle 102 may then determine a region 560 that is based on the first region and the second region. In some instances, the vehicle 102 determines the region 560 using the closest starting end between the first region and the second region and the farthest ending end between the first region and the second region. For example, and as illustrated in the example of FIG. 5G, the region 560 may include a starting end 562 located at the front end 506 of the crosswalk 504 and an ending end 564 located at the second location 558 of the second agent and/or located a threshold distance past the second location 558 of the second agent.

Figure 5H:
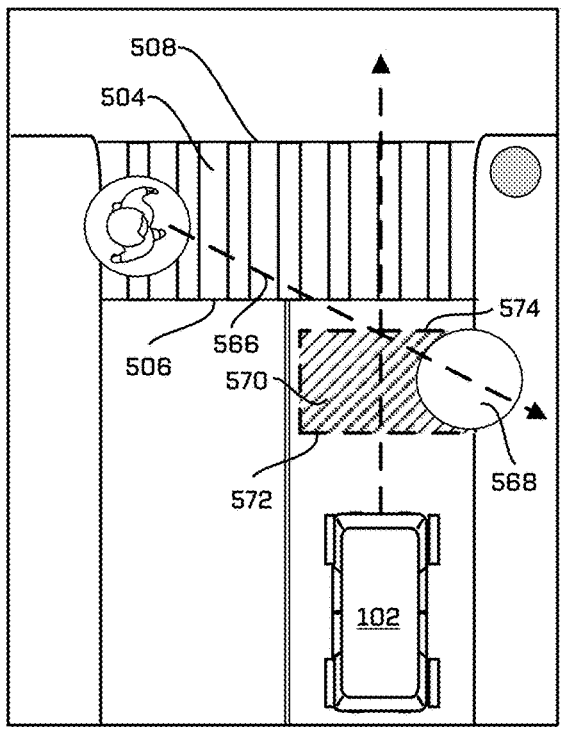
Figure 51:
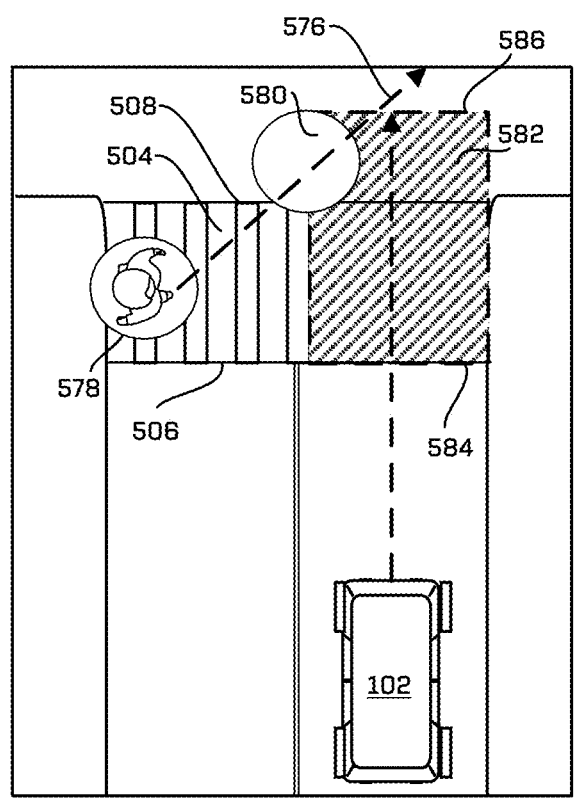

In the example of FIG. 5H, the vehicle 102 may determine that a potential trajectory 566 of the agent. In some examples, and as illustrated in the example of FIG. 5H, the vehicle 102 may then determine the closest location 568 of the agent to the vehicle 102 along the potential trajectory 566. The vehicle 102 may then use the closest location 568 for determining a region 570. In the example of FIG. 5H, since the closest location 568 is between the vehicle 102 and the front end 506 of the crosswalk 504, similar to the example of FIG. 5C, the vehicle 102 may determine the region 570 to include a starting end 572 located at the closest location 568 of the agent and/or a threshold distance before the closest location 568 of the agent, and an ending end 574 located at the closest location 568 of the agent and/or located a threshold distance past the closest location 568 of the agent. However, in other examples, the vehicle 102 may determine a different ending end 574, such as at the starting location of the agent and/or located a threshold distance past the starting location of the agent (similar to the example of FIG. 5A).

Figure 6:
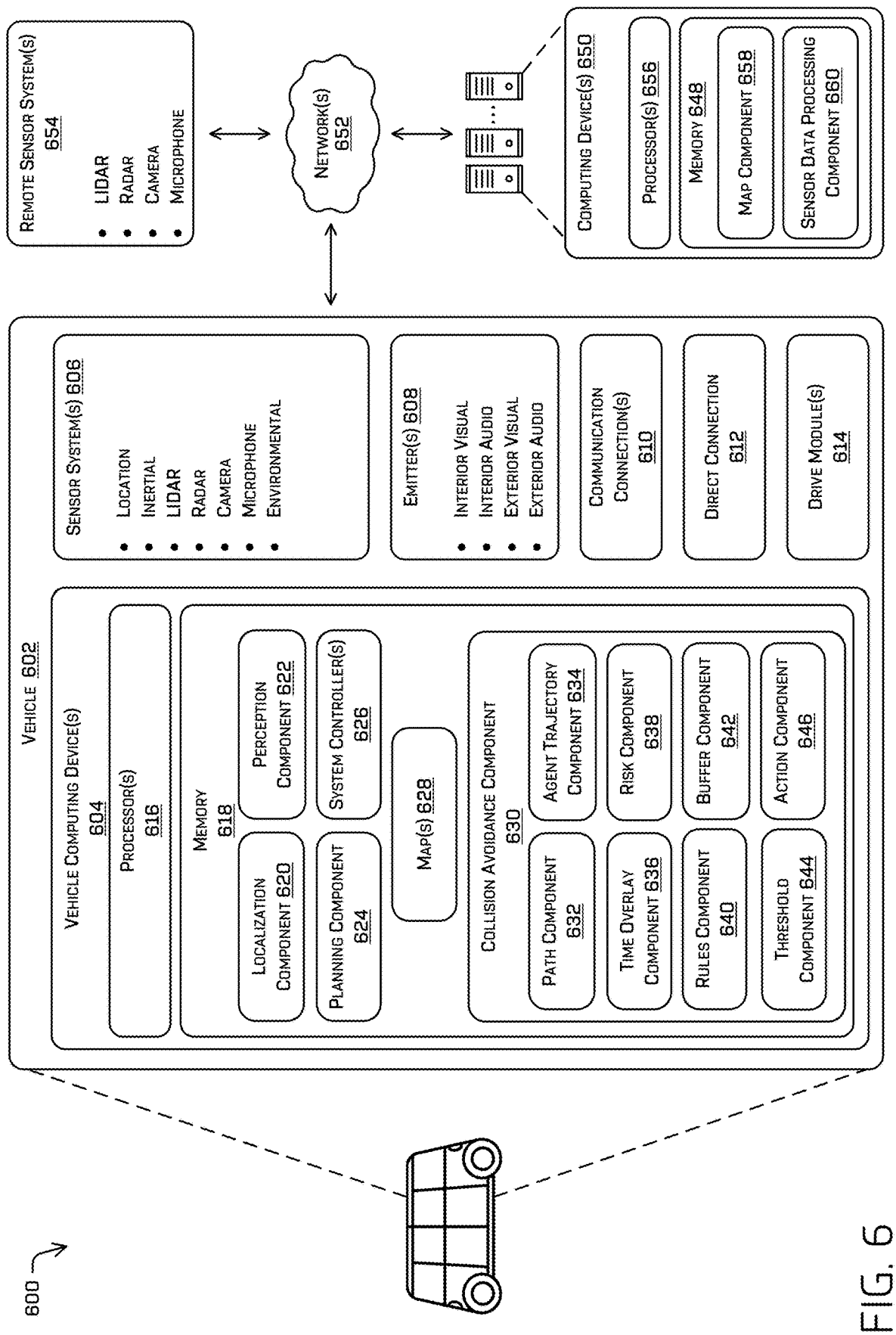
FIG. 6 is a block diagram of an example system for implementing the techniques described herein, in accordance with embodiments of the disclosure.

In the example of FIG. 5I, the vehicle 102 may determine that a potential trajectory 576 of the agent, which is located at a starting location 578. In some examples, and as illustrated in the example of FIG. 5I, the vehicle 102 may then determine the closest location 580 of the agent to the vehicle 102 along the potential trajectory 576. The vehicle 102 may then use the closest location 580 for determining a region 582. In the example of FIG. 5I, and similar to the example of FIG. 5B, since the closest location 580 is further from the back end 508 of the crosswalk 504 than the vehicle 102, the vehicle 102 may determine the region 582 to include a starting end 584 located at the front end 506 of the crosswalk 504 and an ending end 586 located at the potential location 580 of the agent and/or located a threshold distance past the closest location 580 of the agent FIG. 6 is a block diagram of an example system 600 for implementing the techniques described herein. In at least one example, the system 600 may include a vehicle 602, such as the vehicle 102.

The vehicle 602 may include a vehicle computing device(s) 604, one or more sensor systems 606, emitter(s) 608, one or more communication connections 610, at least one direct connection 612, and one or more drive modules 614.

The vehicle computing device(s) 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device(s) 604 stores a localization component 620, a perception component 622, a planning component 624, one or more system controllers 626, one or more maps 628, and a collision avoidance component 630 including a path component 632, an agent trajectory component 634, a time overlap component 636, a risk component 638, a rules component 640, a buffer component 642, a threshold component 644, and an action component 646. Though depicted in FIG. 6 as residing in the memory 618 for illustrative purposes, it is contemplated that the localization component 620, the perception component 622, the planning component 624, the system controller(s) 626, the map(s) 628, and the collision avoidance component 630 including the path component 632, the agent trajectory component 634, the time overlap component 636, the risk component 638, the rules component 640, the buffer component 642, the threshold component 644, and the action component 646 may additionally, or alternatively, be accessible to the vehicle 602 (e.g., stored on, or otherwise accessible by, memory remote from the vehicle 602, such as, for example, on memory 648 of a remote computing device(s) 650.

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a path polygon associated with the vehicle path, as discussed herein.

In some instances, the perception component 622 may include functionality to perform object detection, segmentation, and/or classification. In some examples, the perception component 622 may provide processed sensor data that indicates a presence of an agent (e.g., entity) that is proximate to the vehicle 602 and/or a classification of the agent as an agent type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some examples, the planning component 624 may include a prediction component to generate predicted trajectories of objects (e.g., agents) in an environment. For example, a prediction component may generate one or more predicted trajectories for agents within a threshold distance from the vehicle 602. In some examples, a prediction component may measure a trace of an object and generate a trajectory for the object based on observed and predicted behavior.

In at least one example, the vehicle computing device(s) 604 may include the system controller(s) 626, which may be configured to control steering, propulsion, braking, safety, emitters, communication, and other systems of the vehicle 602. The system controller(s) 626 may communicate with and/or control corresponding systems of the drive module(s) 614 and/or other components of the vehicle 602.

The memory 618 may further include the map(s) 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, and/or the planning component 624 to determine a location of the vehicle 602, detect objects in an environment, and/or generate routes and/or trajectories to navigate within an environment.

In some examples, the map(s) 628 may be stored on a remote computing device(s) (such as the computing device(s) 650) accessible via network(s) 652. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the vehicle computing device(s) 604 may include a collision avoidance component 630. The collision avoidance component 630 may include the path component 632 configured to generate a point path polygon (path polygon) of a path of the vehicle through an environment. In various examples, the path component 632 may receive planning and/or map data from the planning component 624 and/or the map(s) 628 to determine the path of the vehicle.

The path polygon may include a plurality of points and may represent a two-dimensional representation of a planned path of the vehicle 602 through the environment. In various examples, the path polygon may be represented as pairs of points. The pairs of points may represent a left boundary and a right boundary of the vehicle 602. In some examples, the left and right boundaries of the vehicle may represent a minimum distance, such as, for example, a width of the vehicle 602. For example, the left and right boundaries may represent a left and right outermost edge of the vehicle, respectively. In some examples, the left and right boundaries (e.g., minimum distance) may additionally include a buffer outside the outermost edge of the vehicle.

In various examples, a position of the left and right points of a point pair may be individually adjusted based on a maneuver of the vehicle 602, such as, for example a turn. In such examples, the path component 632 may adjust a left point and/or a right point of the point pair outward a distance (e.g., 3 inches, 6 inches, 8 inches, etc.) based on the maneuver. In various examples, the left point and/or the right point may be adjusted outward the distance based on a radius of curvature associated with a turn.

In various examples, the path component 632 may generate the path polygon. In some examples, the path polygon may include pairs of points and/or single points. In some examples, the pairs of points and/or single points may be at consistent intervals (e.g., 0.2 second intervals, 0.6 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a maneuver of the vehicle 602, a speed of the vehicle 602, a density of traffic in the environment, and/or other factors impacting the vehicle 602.

In various examples, the path component 632 may be configured to perform compression techniques on the path polygon. In such examples, the path component 632 may be configured to improve the speed and function of the vehicle computing system itself and the collision avoidance component by removing points from calculations. In some examples, the path component 632 may determine that removing a point may have a no effect or substantially no effect on an area associated with the path polygon. The area of the path polygon may be a two-dimensional area (e.g., as represented in $meters^2$, $feet^2$, $inches^2$, etc.) of the planned (e.g., intended) path of the vehicle 602 through the environment. In some examples, the vehicle computing system may determine that removing the point may modify the area less than a threshold amount. The threshold amount may be a percentage of the total area (e.g., 3%, 6%, 10%, etc.) and/or it may be a pre-defined amount of area (e.g., 2.6 $meters^2$, 2 $feet^2$, 6 $inches^2$ etc.).

In some examples, the path component 632 may determine whether a point in the path polygon is proximate to (e.g., within 60 feet, 16 meters, 26 meters, etc.) a collision risk zone prior to removing the point from calculations. The collision risk zone may include areas in which a risk for collision is elevated, such as, for example, near intersections, pedestrian crossings, parked vehicles (e.g., disabled vehicles, double parked vehicles, etc.) detected via sensor data, or the like. Additionally, a collision risk zone may include areas with a high traffic density, known construction zones, or the like. In various examples, if the vehicle computing system determines the point is proximate to a region, the vehicle computing system may determine to not remove the point from calculations, regardless of whether the area is minimally affected by the removal.

In some examples, the collision avoidance component 630 may include the agent trajectory component 634. The agent trajectory component 634 may be configured to determine one or more possible trajectories associated with an agent in an environment in which the vehicle 602 is operating. In some examples, the trajectories may include any number of possible paths in which the agent 112 may travel from a current position (e.g., at the time of perception) and/or based on a direction of travel. For example, approaching an intersection, an agent may turn right, continue straight, turn left, or conduct a U-turn. The trajectories may include illustrations of each of the aforementioned possible paths of the agent. In some examples, the agent trajectory component 634 may receive data from the perception component 622 regarding agent(s) in the environment. In some examples, the agent trajectory component 634 may determine that an agent is within a threshold distance (e.g., one block, 200 meters, 300 feet, etc.) of the vehicle 602. Based on the determination that the agent is within the threshold distance to the vehicle, the agent trajectory component 634 may determine the trajectories associated with the agent. In some examples, the agent trajectory component 634 may be configured to determine the possible trajectories of each detected agent in the environment.

In various examples, the trajectories may include trajectory samples, or points representing a center of the agent. The center of the agent may include an estimated center of mass, an estimated center point of the agent, or the like. In some examples, the trajectory samples represent a constant velocity of the agent (e.g., substantially equally spaced apart). The constant velocity may be based on a perceived velocity, a known speed limit, or the like. In some examples, the trajectory samples may represent varied velocities of the agent. In such examples, the varied velocities may be based on a pre-defined velocity for a maneuver, such as, for example, slowing to 20 mph for a turn and accelerating back to the speed limit.

In various examples, the agent trajectory component 634 may compare the trajectory samples and/or the associated trajectories with the determined path polygon to determine whether a region may exist in the environment. A region may include an area in which, based on the path polygon and the trajectory, a collision between the vehicle 602 and the agent may exist. In at least some examples, the agent trajectory may be used to calculate an agent polygon. In such examples, a collision zone may be defined by the overlapping area between the agent polygon and the path polygon.

In some examples, the region may exist between the vehicle 602 and the agent if the path polygon and a trajectory associated with the agent intersect. In various examples, the agent trajectory component 634 may determine that the region may exist between the vehicle 602 and the agent based on a trajectory and/or a trajectory sample associated with the agent being within a threshold distance (e.g., 2 feet, 3 feet, 4 meters, 6 meters, etc.) of the path polygon. In some examples, the threshold distance may be based on a pre-defined distance. In various examples, the threshold distance may be determined based on a known or perceived width of the agent. In some examples, the threshold distance may be determined based on a known or perceived width of the agent plus an agent buffer. The agent buffer may represent a safety buffer around the agent. In some examples, the agent buffer may be based, at least in part, on a buffer associated with the point pair position with respect to the vehicle 602, as discussed above.

In various examples, the agent trajectory component 634 may determine that the trajectory is within the threshold distance of the path polygon and may expand the edges of the trajectory from the trajectory sample (e.g., center of the agent) to a distance from the center of the agent. In some examples, the distance may be a known or perceived width of the agent. In some examples, the distance may include a known or perceived width of the agent plus an agent buffer. The agent buffer may represent a safety buffer around the agent. In some examples, the agent buffer may be based, at least in part, on a buffer associated with the point pair position with respect to the vehicle 602, as discussed above. The agent trajectory component 634 may compare the expanded width of the agent trajectory to the path polygon (such as on the map) to determine whether a region exists. If the path polygon and the expanded width of the agent trajectory intersect and/or pass within a minimum allowable distance (e.g., 3 inches, 6 inches, 1 feet), the agent trajectory component 634 may determine that the region exists. If the path polygon and the expanded width of the agent trajectory do not intersect and/or pass by more than the minimum allowable distance, the agent trajectory component 634 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a region may exist, the agent trajectory component 634 and/or the rules component 640 may be configured to determine the bounds of the region. The region may include elements, a vehicle enter point, a vehicle exit point, an agent enter point, an agent exit point, a starting end along the path polygon, and an ending end along the path polygon. Each of the vehicle 602 and agent enter and exit points may include a position and distance. The agent entry point and agent exit point may include trajectory samples, such as trajectory samples, along the trajectory of the agent. In some examples, agent entry point and agent exit point may represent trajectory samples in which a risk of collision does not exist. In various examples, an agent enter point position may be determined by identifying the last trajectory sample associated with the agent trajectory prior to an intersection (e.g., convergence) with the path polygon. In some examples, an agent exit point position may be determined by identifying the first trajectory sample associated with the agent trajectory after the convergence between the trajectory and the path polygon. The distance associated with agent enter point and the agent exit point may be derived from the respective positions as a distance along the trajectory.

The vehicle computing system may determine vehicle enter point and vehicle exit point positions based on an offset distance before and after trajectory. In some examples, the offset distance may include a distance measured perpendicular to the trajectory. In some examples, the offset distance may include a distance measured along the path polygon (e.g., vehicle path) before and after the trajectory. In various examples, the offset distance may be measured from the center of the path polygon. In some examples, the offset distance may be measured from a forward most point of the vehicle along the path polygon. In such examples, the offset distance may account for vehicle maneuvers (e.g., turns) and an affect thereof on a position of the vehicle.

In some examples, the offset distance may include a pre-defined distance (e.g., a constant distance) from the trajectory, such as, for example, based on a length of the vehicle. In some examples, the offset distance before and after the trajectory may be the same or a different constant distance. For example, the vehicle enter point may represent a position with an 8-foot offset distance before the trajectory and the vehicle exit point may represent a position with a 6-foot offset distance after the trajectory.

The rules component 640 may store rule(s) specifying the locations of the starting ends and the locations of the ending ends based on contextual factor(s). For a first example, and as illustrated in the example of FIG. 5A, a first rule may indicate that when a location (and/or potential location) of the agent is within a crosswalk, then the starting end of the region includes the front end of the crosswalk and the ending end of the region includes the location (and/or potential location) of the agent and/or includes a threshold distance after the location (and/or potential location) of the agent. For a second example, and as illustrated in the example of FIG. 5B, a second rule may indicate that when a location (and/or potential location) of the agent is further from the vehicle 602 than the back end of the crosswalk, then the starting end of the region includes the front end of the crosswalk and the ending end of the region includes the location (and/or potential location) of the agent and/or includes a threshold distance after the location (and/or potential location) of the agent.

For a third example, and as illustrated in the example of FIG. 5C, a third rule may indicate that when a location (and/or potential) of the agent is between the vehicle 602 and the front end of the crosswalk, then the starting end of the region includes the location (and/or potential location) of the agent and/or includes a threshold distance before the location (and/or potential location) of the agent, and the ending end of the region includes the location (and/or potential location) of the agent and/or includes a threshold distance after the location (and/or potential location) of the agent. For a fourth example, and as illustrated in the example of FIG. 5F, a fourth rule may indicate that when the agent is crossing a crosswalk that is in a non-crossable state, then the starting end of the region includes the location (and/or potential location) of the agent and/or includes a threshold distance before the location (and/or potential location) of the agent, and the ending end of the region includes the location (and/or potential location) of the agent and/or includes a threshold distance after the location (and/or potential location) of the agent.

For a fifth example, and as illustrated in the example of FIG. 5D, a fifth rule may indicate that when the vehicle 602 is approaching a junction and likely to get struck in the crosswalk, then the starting end of the region includes the front end of the crosswalk and the ending end of the region includes the back end of the crosswalk. For a sixth example, a sixth rule may indicate that when the vehicle 602 is stopped at a junction, then the starting end of the region includes the location (and/or potential location) of the agent and/or includes a threshold distance before the location (and/or potential location) of the agent, and the ending end of the region includes the location (and/or potential location) of the agent and/or includes a threshold distance after the location (and/or potential location) of the agent.

Still, for a seventh example, and as illustrated in the example of FIG. 5F, a seventh rule may indicate that when vehicle 602 has already navigated within a crosswalk, then the starting end of the region includes front end of the vehicle (e.g., the end of the front bumper of the vehicle), and the ending end of the region includes the location (and/or potential location) of the agent and/or includes a threshold distance after the location (and/or potential location) of the agent. While these are just a couple of examples of rules that may be used when determining regions, in other examples, the rules component 640 may use additional and/or alternative rules.

In various examples, the time overlap component 636 may be configured to apply a time-space overlap onto the regions (bounds thereof, such as the vehicle and agent enter and exit points). In various examples, the time-space overlap may be represented as position cones associated with agent trajectories and vehicle 602 trajectories. In various examples, the time overlap component 636 may be configured to determine a vehicle position cone and an agent position cone. The vehicle position cone may be determined based on probable velocities of the vehicle along the planned path (e.g., path polygon) through the region. The agent position cone may be determined based on probable velocities of the agent along the trajectory associated with the region.

In various examples, the probable velocities of the agent may be derived from probable accelerations (e.g., positive and negative accelerations) of the agent. The accelerations may include positive accelerations based on a fast-behavioral model (e.g., aggressive behavior) and negative accelerations based on a slow-behavioral model (e.g., conservative behavior). In various examples, the positive accelerations associated with the agent may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the agent may represent a maximum amount of negative acceleration probable in the environment, such as that based on the initial velocity.

In various examples, the time overlap component 636 may determine a maximum velocity and a minimum velocity over time for the vehicle 602 and the agent, based on respective positive accelerations and negative accelerations. In various examples, the time overlap component 636 may determine an entry time and an exit time associated with the vehicle enter point, vehicle exit point, agent enter point, and agent exit point based on the respective maximum velocities and minimum velocities.

In various examples, time overlap component 636 may determine the agent position cone and the vehicle position cone respective to the region. The agent position cones and the vehicle position cone may be based on an agent entry time, an agent exit time, a vehicle entry time, and a vehicle exit time with respect to the region. In various examples, the agent entry time and the vehicle entry time may be associated with respective maximum velocities. In such examples, the entry times into the region may be associated with a most aggressive estimation of speed. In various examples, the agent exit time and the vehicle exit time may be associated with respective minimum velocities. In such examples, the exit times into the region may be associated with a most conservative estimation of speed.

In some examples, the time-space overlap may be represented as one or more probability density functions associated with probable positions of the agent based on time. The probable positions of the agent may be derived from probable accelerations, and speeds derived therefrom and/or outputs of other systems or subsystems (e.g., a prediction system, which may be, for example, a subsystem of the perception component 622). The probability density functions may represent aggressive and conservative driving speeds, as well as uncertainties based on accelerations of the agent, such as those based on traffic laws, rules of the road, local driving etiquette, traffic patterns, semantic classification of the agent, or the like. The probability density functions may represent two-dimensional area or three-dimensional areas associated with the agent. The total sum of the area under a curve of a probability density function may equal 1.

In various examples, the risk component 638 may determine a risk of collision based on the time-space overlaps determined by the time overlap component 636. In some examples, the risk of collision may be based on an overlap between position cones with respect to the region. In such examples, based on the overlap between position cones (i.e., agent enter time into the region is before vehicle exit time or vehicle enter time into the region is before agent exit time), the risk component 638 may determine that a risk of collision may be high. In some examples, the degree of risk (e.g., high, medium, low) may be based on an amount of overlap (e.g., time gap) between the position cones. In some examples, the amount of overlap may include a percentage of the agent position cone, and/or a percentage of the vehicle position cone. For example, an overlap of 10% of each of the agent position cone and the vehicle position cone may include to a low risk of collision. For another example, an overlap of 16% of the vehicle position cone over the agent position cone may include a medium risk of collision. In various examples, the risk component 638 may determine that no risk of collision exists based on a determination that the agent position cone and the vehicle position cone do not overlap.

In various examples, the risk component 638 may determine whether at last part of a probability density function is positioned within (e.g., intersects and/or lays within) the determined region. In various examples, based on a determination that the probability density function is positioned outside of and does not intersect with the region, the risk component 638 may determine that a risk of collision between the vehicle and the agent is low and/or does not exist. In some examples, based on a determination that at least a portion of the probability density function is positioned and/or intersects with the region, the risk component 638 may determine an overlap. The overlap may be representative of an area under each curve of the probability density functions that overlap with the region.

In various examples, the risk component 638 may determine a percentage of area of the probability density functions that intersects with the region and may determine a risk of collision based on the percentage of area. In some examples, the risk may be deemed high, medium, or low, based on the percentage of area. For example, less than a 29% area may be considered low risk, 30-40% area may be considered medium risk, and above 41% may be considered high risk.

In various examples, the risk component 638 may determine whether the percentage of area under the curve(s) of the probability density function(s) is less than a threshold percentage (e.g., 6%, 16%, 20%, etc.). In such examples, based on a determination that the percentage of area under the curve(s) of the probability density functions is less than the threshold percentage, the vehicle computing system may determine that there is a low and/or no risk of collision between the vehicle and the agent. In some examples, the risk component 638 may determine whether the percentage of area under the curve(s) of the probability density function(s) is exceeds a threshold percentage (e.g., 26%, 60%, 76%, etc.). In such examples, based on a determination that the percentage of area under the curve(s) of the probability density functions is greater than the threshold percentage, the risk component 638 may determine that there is a high risk of collision between the vehicle and the agent. In various examples, a high risk of collision may be a risk that exceeds an acceptable amount of risk.

The buffer component 642 may determine time thresholds and/or distance thresholds using the time-space overlaps. For instance, the buffer component 642 may determine the time thresholds and/or the distance thresholds when there is no overlap between the position cones (i.e., agent enter time into the region is before vehicle exit time or vehicle enter time into the region is before agent exit time). Additionally, the threshold component 644 may determine the time threshold and/or the distance threshold associated with the region. The threshold component 644 may determine the time threshold and/or the distance threshold using a base factor value, a hysteresis factor value, a comfort factor value, an assertiveness factor value, a velocity of the vehicle, and/or the like.

The threshold component 644 may further compare the time buffer value to the time threshold to determine if the time buffer value is equal to or greater than the time threshold. If the threshold component 644 determines that the time buffer value is equal to or greater than the time threshold, then the threshold component 644 may determine that the vehicle 602 will not collide with the agent and/or determine not to yield to the agent. However, if the threshold component 644 determines that the time buffer value is less than the time threshold, then the threshold component 644 may determine that the vehicle 602 and the agent may collide in the region and/or, subsequently, provide such information to other systems and subsystems (e.g., the action component 646).

Additionally, the threshold component 644 may compare the distance buffer value to the distance threshold to determine if the distance buffer value is equal to or greater than the distance threshold. If the threshold component 644 determines that the distance buffer value is equal to or greater than the distance threshold, then the threshold component 644 may determine that the vehicle 602 will not collide with the agent and/or determine not to yield to the agent. However, if the threshold component 644 determines that the distance buffer value is less than the distance threshold, then the threshold component 644 may determine that the vehicle 602 and the agent may collide in the collision zone and/or, subsequently, provide such information to other systems and subsystems (e.g., the action component 646).

In various examples, the action component 646 may, based on a determination of risk (e.g., high, medium, or low risk), determine an action to take. The action may include slowing the vehicle 602 to yield to the agent, stopping the vehicle 602 to yield to the agent, changing lanes left, or changing lanes right. Based on the determined action, the vehicle computing device(s) 604, such as through the system controller(s) 626, may cause the vehicle 602 to perform the action. In at least some examples, such an action may be based on the probability of collision, as described in detail above. In various examples, responsive to determining to adjust a lateral position of the vehicle 602, such as in a lane change to the left or to the right, the collision avoidance component 630 may again generate a path polygon, plot agent trajectories with respect to the path polygon, determine regions, and perform a time-space overlap to determine whether a collision risk may still exist after the action.

In various examples, the action component 646 may be configured to cause the vehicle 602 to perform the action based at least on a display of intent. The display of intent may represent a signal to agents and/or other vehicles in the environment of a follow-up action that the vehicle will take after the action. The display of intent may be based on traffic laws, rules of the road, local driving etiquette, or the like. The display of intent may include entering or partially entering the collision zone, slowly approaching the collision zone (e.g., not coming to a complete stop), or the like. In various examples, the follow-up action corresponding to the display of intent may have a very low or zero risk of collision. In such examples, the follow-up action may be chosen based on a determination of the very low or zero risk of collision. For example, a collision avoidance component 630 may determine that the front-facing portion of a vehicle 602 may enter a collision zone in an intersection without risk of collision with an agent. The collision avoidance component 630 may thus cause the vehicle 602 to enter the collision zone in the intersection to signal an intent to turn left in the intersection.

As can be understood, the components discussed herein (e.g., the localization component 620, the perception component 622, the planning component 624, the system controller(s) 626, the one or more maps 228, the collision avoidance component 630 including the path component 632, the agent trajectory component 634, the time overlap component 636, the risk component 638, the rules component 640, the buffer component 642, the threshold component 644, and the action component 646 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 618 (and the memory 648, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 606 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally or alternatively, the sensor system(s) 606 may send sensor data, via the one or more networks 652, to the one or more computing device(s) 650 at a particular frequency, after a lapse of a predetermined period of time, in near real-time, etc.

The vehicle 602 may also include emitter(s) 608 for emitting light and/or sound, as described above. The emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive module(s) 614. Also, the communication connection(s) 610 may allow the vehicle to communicate with other nearby computing device(s) (e.g., computing device(s) 650, other nearby vehicles, etc.) and/or one or more remote sensor system(s) 654 for receiving sensor data.

The communications connection(s) 610 may include physical and/or logical interfaces for connecting the vehicle computing device(s) 604 to another computing device or a network, such as network(s) 652. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 6G, etc.) or any suitable wired or wireless communications protocol that enables the respective computing device to interface with the other computing device(s).

In at least one example, the vehicle 602 may include drive module(s) 614. In some examples, the vehicle 602 may have a single drive module 614. In at least one example, if the vehicle 602 has multiple drive modules 614, individual drive modules 614 may be positioned on opposite ends of the vehicle 602 (e.g., the front and the rear, etc.). In at least one example, the drive module(s) 614 may include one or more sensor systems to detect conditions of the drive module(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 may also include one or more communication connection(s) that enable communication by the respective drive module with one or more other local or remote computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle. In some instances, the direct connection 612 may further releasably secure the drive module(s) 614 to the body of the vehicle 602.

In at least one example, the localization component 620, the perception component 622, the planning component 624, the system controller(s) 626, the map(s) 628, and the collision avoidance component 630 and various components thereof, may process sensor data, as described above, and may send their respective outputs, over the one or more network(s) 652, to the computing device(s) 650. In at least one example, the localization component 620, the perception component 622, the planning component 624, the system controller(s) 626, the map(s) 628, and the collision avoidance component 630 may send their respective outputs to the computing device(s) 650 at a particular frequency, after a lapse of a predetermined period of time, in near real-time, etc.

In some examples, the vehicle 602 may send sensor data to the computing device(s) 650 via the network(s) 652. In some examples, the vehicle 602 may receive sensor data from the computing device(s) 650 via the network(s) 652. The sensor data may include raw sensor data and/or processed sensor data and/or representations of sensor data. In some examples, the sensor data (raw or processed) may be sent and/or received as one or more log files.

The computing device(s) 650 may include processor(s) 656 and the memory 648 storing a map component 658 and a sensor data processing component 660. In some examples, the map component 658 may include functionality to generate maps of various resolutions. In such examples, the map component 658 may send one or more maps to the vehicle computing device(s) 604 for navigational purposes. In various examples, the sensor data processing component 660 may be configured to receive data from one or more remote sensors, such as sensor systems 606 and/or remote sensor system(s) 654. In some examples, the sensor data processing component 660 may be configured to process the data and send processed sensor data to the vehicle computing system(s) 604, such as for use by the collision avoidance component 630. In some examples, the sensor data processing component 660 may be configured to send raw sensor data to the vehicle computing system(s) 604.

The processor(s) 616 of the vehicle 602 and the processor(s) 656 of the computing device(s) 650 may be any suitable processor capable of executing instructions to process data and perform operations as described herein. By way of example and not limitation, the processor(s) 616 and 656 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 648 are examples of non-transitory computer-readable media. The memory 618 and 648 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 648 may include at least a working memory and a storage memory. For example, the working memory may be a high-speed memory of limited capacity (e.g., cache memory) that is used for storing data to be operated on by the processor(s) 616 and 656. In some instances, the memory 618 and 648 may include a storage memory that may be a lower-speed memory of relatively large capacity that is used for long-term storage of data. In some cases, the processor(s) 616 and 656 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 650 and/or components of the computing device(s) 650 may be associated with the vehicle 602. That is, the vehicle 602 may perform one or more of the functions associated with the computing device(s) 650, and vice versa.

FIGS. 7-10 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 7:
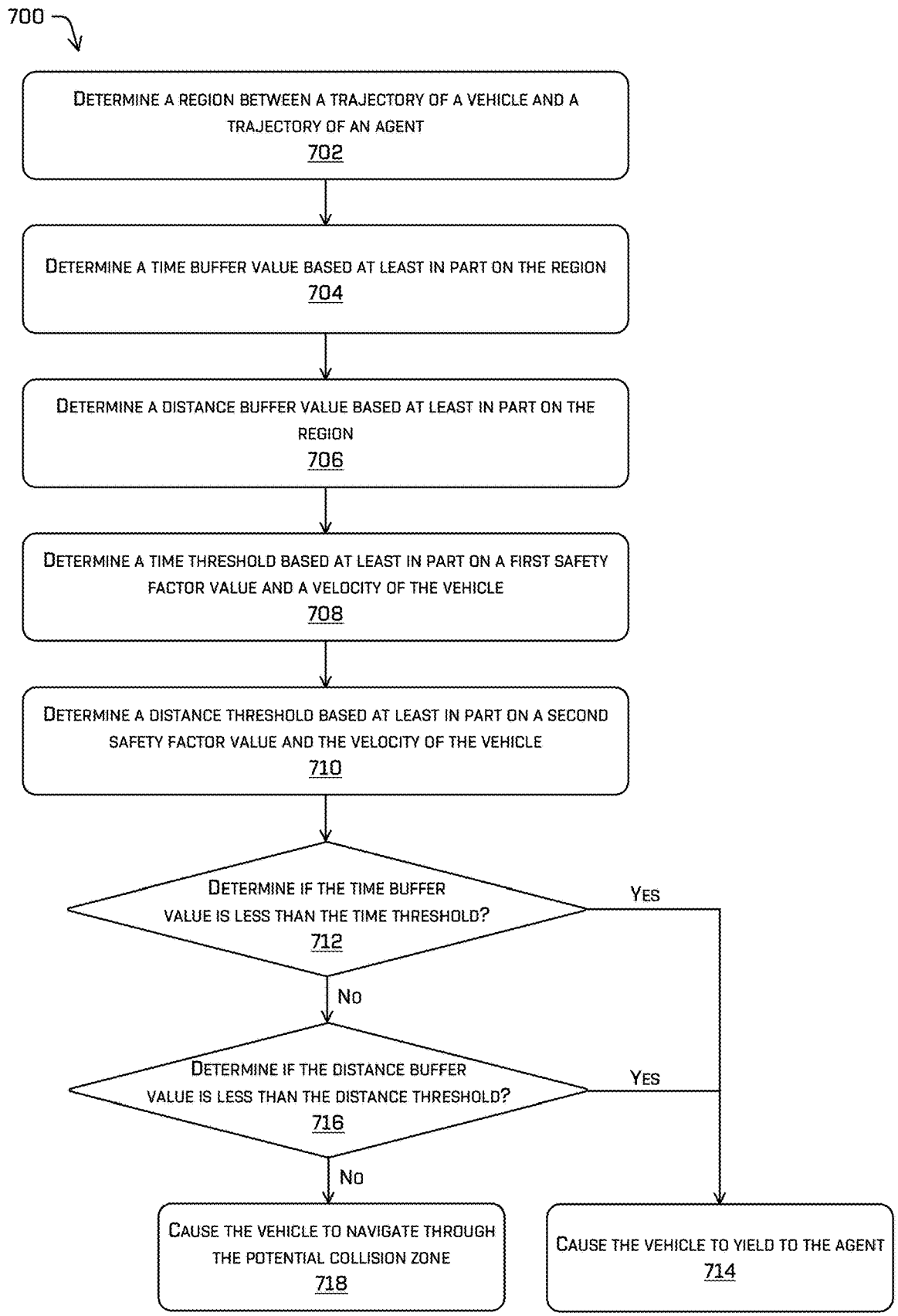
FIG. 7 depicts an example process for determining thresholds associated with a region between an autonomous vehicle and an agent, in accordance with embodiments of the disclosure.

FIG. 7 depicts an example process 700 for determining thresholds associated with a region between an autonomous vehicle and an agent, in accordance with embodiments of the disclosure. At operation 702, the process 700 may include determining a region between a trajectory of a vehicle and a trajectory of an agent. For instance, the vehicle 602 may determine the region between the trajectory of the vehicle 602 and the trajectory of the agent. In some instances, the vehicle 602 determines the region based at least in part on a path polygon associated with the vehicle 602, at least one trajectory associated with the agent, and/or at least one contextual factor associated an environment for which the vehicle 602 is navigating.

At operation 704, the process 700 may include determining a time buffer value based at least in part on the region and at operation 706, the process 700 may include determining a distance buffer value based at least in part on the region. For instance, the vehicle 602 may apply a time-space overlap associated with the region, where the time-space overlap represents a position cone of probable speeds at which the agent may travel through the region and a position cone of probably speeds at which the vehicle 602 may travel though the region. The vehicle 602 may then determine the time buffer value and the distance buffer value using the time-space overlap.

At operation 708, the process 700 may include determining a time threshold based at least in part on a first safety factor value and a velocity of the vehicle. For instance, the vehicle 602 may determine the first safety factor value and the velocity of the vehicle 602. The vehicle 602 may then use the first safety factor value and the velocity to determine the time threshold. In some instances, the vehicle 602 may further use a first hysteresis factor value, a first comfort factor value, and/or a first assertiveness factor value to determine the time threshold.

At operation 710, the process 700 may include determining a distance threshold based at least in part on a second safety factor value and the velocity of the vehicle. For instance, the vehicle 602 may determine the second safety factor value and the velocity of the vehicle 602. The vehicle 602 may then use the second safety factor value and the velocity to determine the time threshold. In some instances, the vehicle 602 may further use a second hysteresis factor value, a second comfort factor, value and/or a second assertiveness factor value to determine the time threshold.

At operation 712, the process 700 may include determining if the time buffer value is less than the time threshold. For instance, the vehicle 602 may determine if the time buffer value is less than the time threshold. If at operation 712 it is determined that the time buffer value is less than the time threshold (e.g., "YES"), then at operation 714, the process 700 may include causing the vehicle to yield to the agent. For instance, if the vehicle 602 determines that the time buffer value is less than the time threshold, then the vehicle 602 may yield to the agent. In some instances, yielding to the agent may include stopping before the region.

However, if at operation 712 it is determined that the time buffer value is not less than the time threshold (e.g., "NO"), then at operation 716, the process 700 may include determining if the distance buffer value is less than the distance threshold. For instance, the vehicle 602 may determine if the distance buffer value is less than the distance threshold. If at operation 716 it is determined that the distance buffer value is less than the distance threshold (e.g., "YES"), then at operation 714, the process 700 may include causing the vehicle to yield to the agent. For instance, if the vehicle 602 determines that the distance buffer value is less than the distance threshold, then the vehicle 602 may yield to the agent. In some instances, yielding to the agent may include stopping before the region.

However, if at operation 716 it is determined that the distance buffer value is not less than the distance threshold (e.g., "NO"), then at operation 718, the process 700 may include causing the vehicle to navigate through the region. For instance, the vehicle 602 may navigate through the potential collision before the agent (e.g., the vehicle 602 may not yield to the agent).

Figure 8:
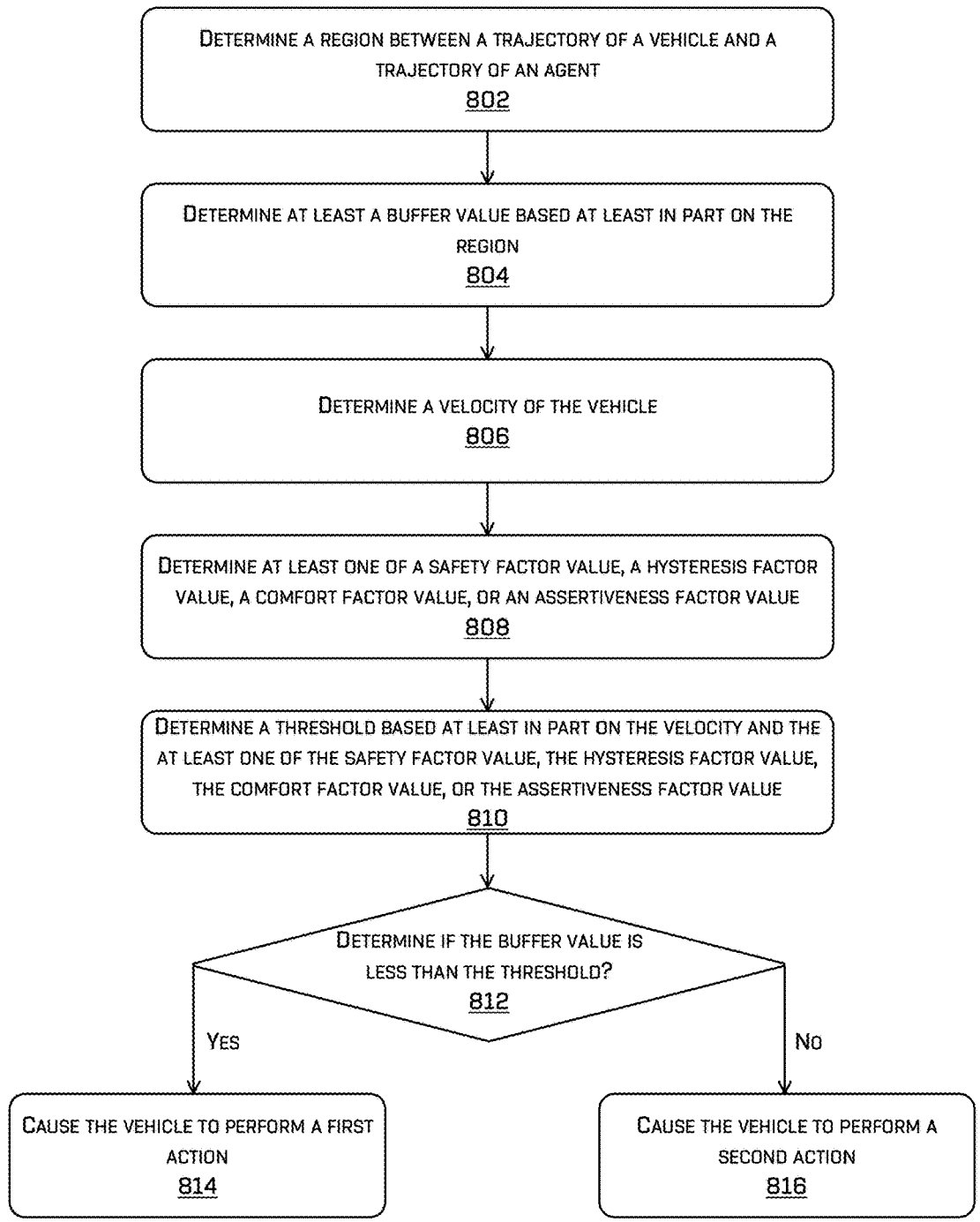
FIG. 8 depicts an example process for determining a threshold using a velocity of an autonomous vehicle and one or more factors, in accordance with embodiments of the disclosure.

FIG. 8 depicts an example process 800 for determining a threshold using a velocity of an autonomous vehicle and one or more factors, in accordance with embodiments of the disclosure. At operation 802, the process 800 may include determining a region between a trajectory of a vehicle and a trajectory of an agent. For instance, the vehicle 602 may determine the region between the trajectory of the vehicle 602 and the trajectory of the agent. In some instances, the vehicle 602 determines the region based at least in part on a path polygon associated with the vehicle 602, at least one trajectory associated with the agent, and/or at least one contextual factor associated an environment for which the vehicle 602 is navigating.

At operation 804, the process 800 may include determining at least a buffer value based at least in part on the region. For instance, the vehicle 602 may apply a time-space overlap associated with the region, where the time-space overlap represents a position cone of probable speeds at which the agent may travel through the region and a position cone of probably speeds at which the vehicle may travel though the region. The vehicle 602 may then use the time-space overlap to determine a time buffer value and/or a distance buffer value associated with the region.

At operation 806, the process 800 may include determining a velocity of the vehicle and at operation 808, the process 800 may include determining at least one of a safety factor value, a hysteresis factor value, a comfort factor value, or an assertiveness factor value. For instance, the vehicle 602 may use sensor data to determine the velocity of the vehicle 602. The vehicle 602 may also determine the at least one of the safety factor value, the hysteresis factor value, the comfort factor value, or the assertiveness factor value. In some instance, the at least one of the safety factor value, the hysteresis factor value, the comfort factor value, or the assertiveness factor value is associated with a time threshold. In some instances, the at least one of the safety factor value, the hysteresis factor value, the comfort factor value, or the assertiveness factor value is associated with a distance threshold.

At operation 810, the process 800 may include determining a threshold based at least in part on the velocity and the at least one of the safety factor value, the hysteresis factor value, the comfort factor value, or the assertiveness factor value. For instance, the vehicle 602 may determine the threshold. In some instances, the threshold includes a time threshold. In some instances, the threshold includes a distance threshold.

At operation 812, the process 800 may include determining if the buffer value is less than the threshold. For instance, the vehicle 602 may determine if the buffer value is less than the threshold. If at operation 812 it is determined that the buffer value is less than the threshold (e.g., "YES"), then at operation 814, the process 800 may include causing the vehicle to perform a first action. For instance, if the vehicle 602 determines that the buffer value is less than the threshold, then the vehicle 602 may yield to the agent.

However, if at operation 812 it is determined that the buffer value is not less than the threshold (e.g., "NO"), then at operation 816, the process 800 may include causing the vehicle to perform a second action. For instance, if the vehicle 602 determines that the buffer value is not less than the threshold, then the vehicle 602 may determine to perform the second action, such as not yielding to the agent. As such, the vehicle 602 may navigate through the region before the agent.

Figure 9:
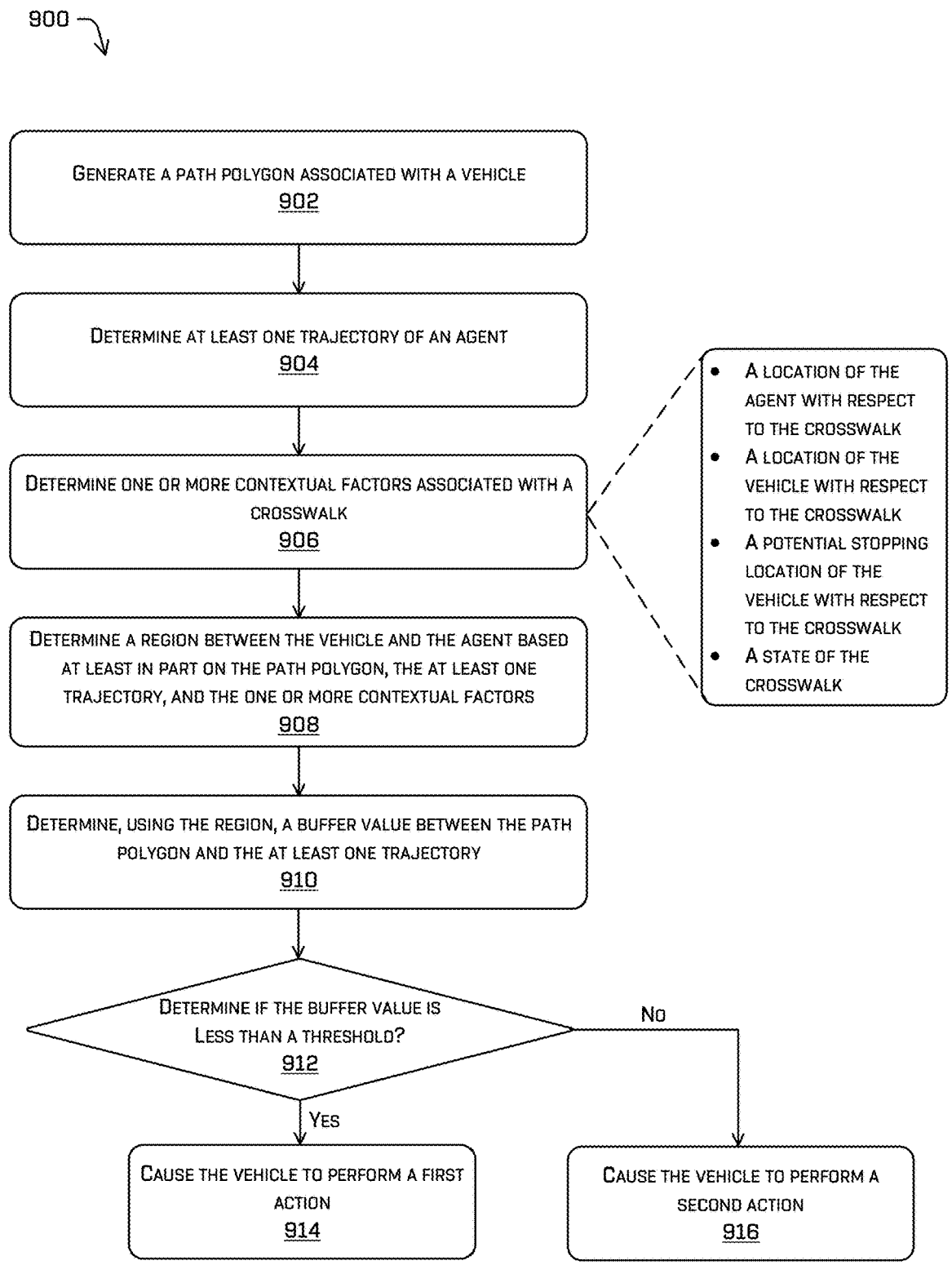
FIG. 9 depicts an example process for determining a region using one or more contextual factors associated with a crosswalk, in accordance with embodiments of the disclosure.

FIG. 9 depicts an example process 900 for determining a region using one or more contextual factors associated with a crosswalk, in accordance with embodiments of the disclosure. At operation 902, the process 900 may include generating a path polygon associated with a vehicle. For instance, the vehicle 602 may generate the path polygon representing a two-dimensional path of the vehicle (e.g., vehicle path) through the environment. The path polygon may include a plurality of point pairs (or simply points) along a planned path of the vehicle.

At operation 904, the process 900 may include determining at least one trajectory of an agent. For instance, the vehicle 602 may use sensor data to identify the agent. The vehicle 602 may then determine the at least one trajectory of the agent.

At operation 906, the process 900 may include determining one or more contextual factors associated with a crosswalk. For instance, the vehicle 602 may use the sensor data to determine the one or more contextual factors associated with the crosswalk. The one or more contextual factors may include, but are not limited to, a location (and/or potential location) of the agent with respect to the crosswalk, a location of the vehicle 602 with respect to the crosswalk, a potential stopping location of the vehicle 602 with respect to the crosswalk, and a state of the crosswalk. The state of the crosswalk may include a crossing state, in which the agent is authorized to cross the crosswalk, and a non-crossing state, in which the agent is not authorized to cross the crosswalk.

At operation 908, the process 900 may include determining a region between the vehicle and the agent based at least in part on the path polygon, the at least one trajectory, and the one or more contextual factors. For instance, the vehicle 602 may determine the region as being located along the path polygon and the at least one trajectory. The vehicle 602 may then use the one or more contextual factors to determine at least a starting end and an ending end for the region. In some instances, the vehicle 602 determines the starting end and/or the ending end using one or more rules.

At operation 910, the process 900 may include determining, using the region, a buffer value between the path polygon and the at least one trajectory. For instance, the vehicle 602 may apply a time-space overlap associated with the region, where the time-space overlap represents a position cone of probable speeds at which the agent may travel through the region and a position cone of probably speeds at which the vehicle may travel though the region. The vehicle 602 may then use the time-space overlap to determine a time buffer value and/or a distance buffer value associated with the region.

At operation 912, the process 900 may include determining if the buffer value is less than a threshold. For instance, the vehicle 602 may determine if the buffer value is less than the threshold. If at operation 912 it is determined that the buffer value is less than the threshold (e.g., "YES"), then at operation 914, the process 900 may include causing the vehicle to perform a first action. For instance, if the vehicle 602 determines that the buffer value is less than the threshold, then the vehicle 602 may yield to the agent.

However, if at operation 912 it is determined that the buffer value is not less than the threshold (e.g., "NO"), then at operation 916, the process 900 may include causing the vehicle to perform a second action. For instance, if the vehicle 602 determines that the buffer value is not less than the threshold, then the vehicle 602 may determine to perform a second action, such as not yielding to the agent. As such, the vehicle 602 may navigate through the region before the agent.

Figure 10:
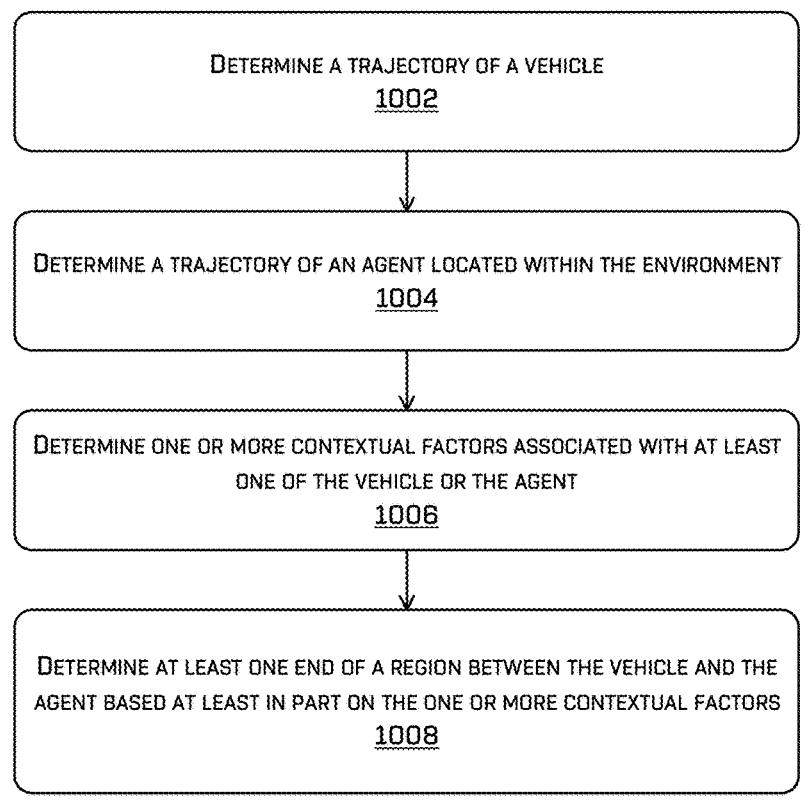
FIG. 10 depicts an example process for determining a region using one or more contextual factors associated with a location of an autonomous vehicle and/or a location of an agent, in accordance with embodiments of the disclosure.

FIG. 10 depicts an example process 1000 for determining a region using one or more contextual factors associated with a location of an autonomous vehicle or a location of an agent, in accordance with embodiments of the disclosure. At operation 1002, the process 1000 may include determining a trajectory of a vehicle. For instance, the vehicle 602 may use sensor data to determine the trajectory of the vehicle 602. In some instances, the vehicle 602 may then generate a path polygon representing a two-dimensional path of the vehicle (e.g., vehicle path) through the environment. The path polygon may include a plurality of point pairs (or simply points) along a planned path of the vehicle.

At operation 10004, the process 900 may include determining a trajectory an agent. For instance, the vehicle 602 may use sensor data to identify the agent. The vehicle 602 may then determine the trajectory of the agent.

At operation 1006, the process 1000 may include determining one or more contextual factors associated with at least one of the vehicle or the agent. For instance, the vehicle 602 may use the sensor data to determine the one or more contextual factors associated with the vehicle and/or the agent. The one or more contextual factors may include, but are not limited to, a location (and/or potential location) of the agent with respect to a crosswalk, a location of the vehicle 602 with respect to the crosswalk, a potential stopping location of the vehicle 602 with respect to the crosswalk, and a state of the crosswalk.

At operation 1008, the process 1000 may include determining at least one end of a region between the vehicle and the agent based at least in part on the one or more contextual factors. For instance, the vehicle 602 may use the one or more contextual factors to determine a starting end and/or an ending end of the region along the trajectory of the vehicle 602. In some instances, the vehicle 602 uses one or more rules when determining the starting end and/or the ending end of the region.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: An autonomous vehicle comprising: one or more processors; and one or more computer-readable media storing instructions that, when executed by the one or more processors, cause the one or more processors to perform operations comprising: determining a region in an environment through which the autonomous vehicle and an object pass based at least in part on a trajectory of the autonomous vehicle and a trajectory of the object, the region including an area of potential collision between the autonomous vehicle and the agent; determining, based at least in part on the region, at least one of: a time buffer value indicating a predicted difference in time between the autonomous vehicle being located within the region and the object being located within the region; or a distance buffer value indicating a predicted distance between the autonomous vehicle and the region when the object is located within the region or between the object and the region when the vehicle is located within the region; determining a threshold based at least in part on a safety factor value associated with navigating the autonomous vehicle and a velocity of the autonomous vehicle; determining whether the at least one of the time buffer value or the distance buffer value is less than the threshold; and based at least in part on determining that the at least one of the time buffer value or the distance buffer value being less than the threshold, causing the autonomous vehicle to yield to the agent.

B: The autonomous vehicle as recited in paragraph A, the operations further comprising: determining a hysteresis factor value associated with navigating the autonomous vehicle based at least in part on at least one of: whether the autonomous vehicle has recently stopped; or whether the autonomous vehicle has recently yielded, wherein determining the threshold is further based at least in part on the hysteresis factor value.

C: The autonomous vehicle as recited in either of paragraphs A or B, the operations further comprising: determining a comfort factor value associated with navigating the autonomous vehicle based at least in part on at least one of: whether a deceleration associated with the autonomous vehicle stopping before the region exceeds a threshold deceleration; whether the object is located within the region; whether the object is located within a crosswalk associated with the region; whether a first vehicle is stopped for the crosswalk; or whether a second vehicle is navigating through the crosswalk, wherein determining the threshold is further based at least in part on the comfort factor value.

D: The autonomous vehicle as recited in any of paragraphs A-C, wherein determining the threshold comprises: determining a first value based at least in part on the safety factor value associated with navigating the autonomous vehicle and the velocity of the autonomous vehicle; determining a second value based at least in part on a hysteresis factor value associated with navigating the autonomous vehicle and the velocity of the autonomous vehicle; determining a third value based at least in part on a comfort factor value associated with navigating the autonomous vehicle; and determining the threshold based at least in part on the first value, the second value, and the third value.

E: The autonomous vehicle as recited in any of paragraphs A-D, wherein the threshold is a time threshold, and wherein the operations further comprise: determining a distance threshold based at least in part on an additional safety factor value associated with navigating the vehicle and the velocity of the autonomous vehicle, wherein determining whether the at least one of the time buffer value or the distance buffer value is less than the threshold comprises: determining whether the time buffer value is less than the time threshold; and determining whether the distance buffer value is less than the distance threshold.

F: A method comprising: determining, based at least in part on a region in an environment, a buffer value between a vehicle and an object, the buffer value being associated with the vehicle and the object passing through the region; determining a threshold based at least in part on a safety factor value associated with navigating the vehicle and a velocity of the vehicle; determining whether the buffer value is less than the threshold; and based at least in part on determining whether the buffer value is less than the threshold, causing the vehicle to perform an action.

G: The method as recited in paragraph F, wherein the buffer value comprises at least one of: a time buffer value indicating a predicted difference in time between the vehicle being located within the region and the object being located within the region; or a distance buffer value indicating a predicted distance between the vehicle and the region when the object is located within the region or between the object and the region when the vehicle is located within the region.

H: The method as recited in either of paragraphs F or G, wherein causing the vehicle to perform the action comprises: causing the vehicle to yield to the object based at least in part on determining that the buffer value is less than the threshold; or causing the vehicle to navigate through the region before the object based at least in part on determining that the buffer value is equal to or greater than the threshold.

I: The method as recited in any of paragraphs F-H, wherein the buffer value is a time buffer value and the threshold is a time threshold, and wherein the method further comprises: determining, using the region, a distance buffer value between the vehicle and the object; determining a distance threshold based at least in part on an additional safety factor value associated with navigating the vehicle and the velocity of the vehicle; and determining whether the distance buffer value is less than the distance threshold, wherein causing the vehicle to perform the action is further based at least in part on determining whether the distance buffer value is less than the distance threshold.

J: The method as recited in any of paragraphs F-I, further comprising: determining a hysteresis factor value associated with navigating the vehicle based at least in part on at least one of: whether the vehicle has recently stopped; or whether the vehicle has recently yielded, wherein determining the threshold is further based at least in part on the hysteresis factor value.

K: The method as recited in any of paragraphs F-J, further comprising: determining a comfort factor value associated with navigating the vehicle based at least in part on at least one of: whether a deceleration associated with the vehicle stopping before the region exceeds a threshold deceleration; whether the object is located within the region; whether the object is located within a crosswalk associated with the region; whether a first additional vehicle is stopped for the crosswalk; or whether a second additional vehicle is navigating through the crosswalk, wherein determining the threshold is further based at least in part on the comfort factor value.

L: The method as recited in any of paragraphs F-K, wherein determining the threshold comprises: determining a first value based at least in part on the safety factor value associated with navigating the vehicle and the velocity of the vehicle; determining a second value based at least in part on a hysteresis factor value associated with navigating the vehicle and the velocity of the vehicle; determining a third value based at least in part on a comfort factor value associated with navigating the vehicle; and determining the threshold based at least in part on the first value, the second value, and the third value.

M: The method as recited in any of paragraphs F-L, further comprising: determining a first weight associated with the first value; determining a second weight associated with the second value; and determining a third weight associated with the third value, wherein determining the threshold is further based at least in part on the first weight, the second weight, and the third weight.

N: The method as recited in any of paragraphs F-M, further comprising: determining, using the region, at least an additional buffer value between the vehicle and an additional object, the additional buffer value including at least one of: a time buffer value indicating a predicted difference in time between the vehicle being located within the region and the additional object being located within the region; or a distance buffer value indicating a predicted distance between the vehicle and the region when the additional object is located within the region or between the additional object and the region when the vehicle is located within the region; and determining whether the additional buffer value is less than the threshold, wherein causing the vehicle to perform the action is further based at least in part on determining whether the additional buffer value is less than the threshold.

O: The method as recited in any of paragraphs F-N, wherein the buffer value is associated with a first predicted trajectory of the object, and wherein the method further comprises: determining, using the region, at least an additional buffer value between the vehicle and the object, the additional buffer value being associated with a second predicted trajectory of the object; and determining whether the additional buffer value is less than the threshold, wherein causing the vehicle to perform the action is further based at least in part on determining whether the additional buffer value is less than the threshold.

P: The method as recited in any of paragraphs F-O, wherein the buffer value is associated with a first predicted velocity of the object, and wherein the method further comprises: determining, using the region, at least an additional buffer value between the vehicle and the object, the additional buffer value being associated with a second predicted velocity of the object; and determining whether the additional buffer value is less than the threshold, wherein causing the vehicle to perform the action is further based at least in part on determining whether the additional buffer value is less than the threshold.

Q: The method as recited in any of paragraphs F-P, wherein determining the buffer value between the vehicle and the object comprises at least; determining, based at least in part on a first predicted velocity of the vehicle, a first predicted trajectory of the vehicle passing through the region; determining, based at least in part on a second predicted velocity of the vehicle, a second predicted trajectory of the vehicle passing through the region, the second predicted velocity of the vehicle being greater than the first predicted velocity of the vehicle; determining, based at least in part on a first predicted velocity of the object, a first predicted trajectory of the object passing through the region; determining, based at least in part on a second predicted velocity of the object, a second predicted trajectory of the object passing through the region, the second predicted velocity of the object being greater than the first predicted velocity of the object; and determining the buffer value as including at least one of: a time buffer value indicating a predicted difference in time between the vehicle being located within the region and the object being located within the region; or a distance buffer value indicating a predicted distance between the vehicle and the region when the object is located within the region or between the object and the region when the vehicle is located within the region.

R: One or more non-transitory computer-readable media storing instructions that, when executed by one or more processors, cause one or more computing devices to perform operations comprising: determining a vehicle trajectory associated with a vehicle; determining an object trajectory associated with an object; determining a buffer value based at least in part on the vehicle trajectory and the object trajectory; determining a threshold based at least in part on at least one or more of actions performed by the vehicle or a velocity of the vehicle; determining whether the buffer value is less than the threshold; and based at least in part determining that the buffer value is less than the threshold, determining an action for the vehicle.

S: The one or more non-transitory computer-readable media as recited in paragraph R, wherein the buffer value is a time buffer value and the threshold is a time threshold, and wherein the operations further comprise: determining a distance buffer value based at least in part on the vehicle trajectory and the object trajectory; determining a distance threshold based at least in part on at least one or more of the actions performed by the vehicle or the velocity of the vehicle; and determining whether the distance buffer value is less than the distance threshold, wherein determining the action for the vehicle is further based at least in part on determining whether the distance buffer value is less than the distance threshold.

T: The one or more non-transitory computer-readable media as recited in either of paragraphs R or S, the operations further comprising: determining a factor value based at least in part on the at least one or more of actions performed by the vehicle or the velocity of the vehicle, wherein determining the threshold is based at least in part on the factor value and the velocity of the vehicle.

U: A system comprising: one or more sensors; one or more processors; and one or more computer-readable media storing instructions that, when executed by the one or more processors, cause the one or more processors to perform operations comprising: determining a path polygon associated with an autonomous vehicle, the path polygon representing a planned path of the autonomous vehicle traveling through an environment; receiving sensor data from the one or more sensors; determining, based at least in part on the sensor data, a trajectory associated with an object in the environment; determining the object is a pedestrian; determining one or more contextual factors indicative of the object being one or more of within or within a threshold distance of a crosswalk; determining, based at least in part on the one or more contextual factors, a region associated with the path polygon and the trajectory, the region including an area through which the autonomous vehicle and the object pass; and causing an action of the autonomous vehicle to be performed based at least in part on the region.

V: The system as recited in paragraph U, wherein: determining the one or more contextual factors associated with the crosswalk comprises: determining a location of the crosswalk; and determining, based at least in part on the sensor data, that a location of the pedestrian is within the crosswalk; and determining the region comprises determining, based at least in part on the location of the pedestrian being within the crosswalk, the region as starting at an end of the crosswalk proximate the vehicle.

W: The system as recited in either of paragraphs U or V, wherein: determining the one or more contextual factors associated with the crosswalk comprises determining a location of the crosswalk; and determining, based at least in part on the sensor data, that a location of the object is outside of the crosswalk and further from the vehicle than the crosswalk; and determining the region comprises determining, based at least in part on the location of the object being outside of the crosswalk, the region as starting at an edge of the crosswalk furthest from the vehicle.

X: The system as recited in any of paragraphs U-W, wherein: determining the one or more contextual factors associated with the crosswalk comprises determining, based at least in part on the sensor data, that: the crosswalk is in a non-crossable state; and a location of the object is within the crosswalk; and determining the region comprises determining, based at least in part on the crosswalk being in the non-crossable state and the location of the object, the region as starting within a distance before a potential location of the pedestrian along the path polygon.

Y: The system as recited in any of paragraphs U-X, the operations further comprising: determining a buffer value between the autonomous vehicle and the object, the buffer value being associated with the vehicle and the object passing through the region; and determining whether the buffer value is less than a threshold, wherein causing the action of the autonomous vehicle to be performed comprises at least one of: causing the vehicle to yield to the object based at least in part on the buffer value being less than the threshold; or causing the vehicle to pass through the region before the object based at least in part on the buffer value being equal to or greater than the threshold.

Z: A method comprising: receiving sensor data from a sensor of a vehicle; determining, based at least in part on the sensor data, a pedestrian proximate the vehicle; determining, based at least in part on one or more of the sensor data or map data available to the vehicle, a contextual factor associated with a crosswalk; determining, based at least in part on the contextual factor, a region associated with a vehicle trajectory of the vehicle and a pedestrian trajectory of the pedestrian, the region including an area through which both the vehicle and the pedestrian travel; and determining, based at least in part on the region, an action of the vehicle.

AA: The method as recited in paragraph Z, wherein determining the contextual factor associated with the crosswalk comprises determining at least one of: that the pedestrian is within the crosswalk that the pedestrian is between the vehicle and a first end of the crosswalk closest the vehicle; that the pedestrian is further from the vehicle than a second end of the crosswalk, the first end of the crosswalk being closer to the vehicle than the second end of the crosswalk; that the crosswalk is in a crossable state; that the crosswalk is in a non-crossable state; that the vehicle is within the crosswalk; or that the vehicle is likely to stop within the crosswalk.

AB: The method as recited in either of paragraphs Z or AA, wherein determining the region comprises determining, based at least in part on the contextual factor, at least one of: a starting end of the region; or an ending end of the region, the ending end of the of the region being further from the vehicle than the starting end.

AC: The method as recited in any of paragraphs Z-AB, wherein the contextual factor includes at least: a first contextual factor associated with a location of the pedestrian with respect to the crosswalk; and a second contextual factor associated with a location of an additional pedestrian with respect to the crosswalk.

AD: The method as recited in any of paragraphs Z-AC, wherein: determining the contextual factor associated with the crosswalk comprises determining, based at least in part on the one or more of the sensor data or the map data, that the pedestrian is within the crosswalk; and determining the region comprises determining, based at least in part on the pedestrian being within the crosswalk, the region as starting at an end of the crosswalk.

AE: The method as recited in any of paragraphs Z-AD, wherein: determining the contextual factor associated with the crosswalk comprises determining, based at least in part on the one or more of the sensor data or the map data, that the pedestrian is further than the crosswalk to the vehicle; and determining the region comprises determining, based at least in part on the pedestrian being further than the crosswalk to the vehicle, the region as having a first side along an edge of the crosswalk furthest from the vehicle.

AF: The method as recited in any of paragraphs Z-AE, wherein: determining the contextual factor associated with the crosswalk comprises determining, based at least in part on the one or more of the sensor data or the map data, that: the crosswalk is in a non-crossable state; and the pedestrian is within the crosswalk; and determining the region comprises determining, based at least in part on the crosswalk being in the non-crossable state and the pedestrian being within the crosswalk, the region as starting within a first distance before a potential location of the pedestrian along the vehicle trajectory of the vehicle.

AG: The method as recited in any of paragraphs Z-AF, wherein: determining the contextual factor associated with the crosswalk comprises determining, based at least in part on the one or more of the sensor data or the map data, that the vehicle is likely to stop within the crosswalk; and determining the region comprises determining, based at least in part on the vehicle being likely to stop within the crosswalk, the region as starting at an end of the crosswalk that is closest to the vehicle along the vehicle trajectory of the vehicle.

AH: The method as recited in any of paragraphs Z-AG, wherein: determining the contextual factor associated with the crosswalk comprises determining, based at least in part on the one or more of the sensor data or the map data, that the vehicle is stopped within the crosswalk; and determining the region comprises determining, based at least in part on the vehicle being stopped within the crosswalk, the region having a width commensurate with a width of the crosswalk.

AI: The method as recited in any of paragraphs Z-AH, wherein: determining the contextual factor associated with the crosswalk comprises determining, based at least in part on the one or more of the sensor data or the map data, that the vehicle has entered the crosswalk; and determining the region comprises determining, based at least in part on the vehicle entering the crosswalk, the region having an edge commensurate with the position of the vehicle in the crosswalk.

AJ: The method as recited in any of paragraphs Z-AI, further comprising determining, using the region, a buffer value based at least in part on the region, the vehicle trajectory, and the pedestrian trajectory; and determining whether the buffer value is below a threshold, wherein determining the action of the vehicle is based at least in part on whether the buffer value is below the threshold.

AK: The method as recited in any of paragraphs Z-AJ, wherein determining the action of the vehicle comprises at least one of: determining to yield to the pedestrian based at least in part on the buffer value being below the threshold; or determining to navigate the vehicle through the region before the pedestrian based at least in part on the buffer value being equal to or greater than the threshold.

AL: The method as recited in any of paragraphs Z-AK, further comprising: determining a potential location of the pedestrian based at least in part on the pedestrian trajectory of the pedestrian, the potential location including a closest location to the vehicle along the pedestrian trajectory of the pedestrian, wherein determining the contextual factor is based at least in part on the potential location.

AM: One or more non-transitory computer-readable media storing instructions that, when executed by one or more processors, cause one or more computing devices to perform operations comprising: receiving sensor data from a sensor on a vehicle; determining, based at least in part on one or more of the sensor data or map data available to the vehicle, a contextual factor associated with at least one of a location of the vehicle or a location of a pedestrian; determining, based at least in part on the contextual factor, a region associated with a vehicle trajectory of the vehicle and a location of the pedestrian, the region including an area through which both the vehicle and the pedestrian travel; and determining, based at least in part on the region, whether to yield to the pedestrian.

AN: The one or more non-transitory computer-readable media as recited in paragraph AM, wherein determining the contextual factor comprises determining, based at least in part on the one or more of the sensor data or the map data, at least one of: that the pedestrian is within a crosswalk that the pedestrian is between the vehicle and the crosswalk; that the pedestrian is further from the vehicle than the crosswalk; that the crosswalk is in a crossable state; that the crosswalk is in a non-crossable state; that the vehicle is within the crosswalk; or that the vehicle is likely to stop within the crosswalk.

What is claimed is:
1. A method comprising:
determining a location of a pedestrian relative to a crosswalk;
determining, based at least in part on the location, a region in an environment through which a vehicle and the pedestrian pass;
determining a first speed associated with the pedestrian;
determining, based at least in part on the first speed, a first time period that the pedestrian is expected to be within the region;

determining a second speed associated with the pedestrian;
determining, based at least in part on the second speed, a second time period that the pedestrian is expected to be within the region; and
maneuvering the vehicle based at least in part on the first time period and the second time period.

2. The method of claim 1, further comprising:
determining a first planned speed associated with the vehicle;
determining, based at least in part on the first planned speed, a third time period that the vehicle is expected to be within the region;
determining a second planned speed associated with the vehicle; and
determining, based at least in part on the second planned speed, a fourth time period that the vehicle is expected to be within the region,
wherein maneuvering the vehicle is further based at least in part on the third time period and the fourth time period.

3. The method of claim 1, wherein:
determining the first time period that the pedestrian is expected to be within the region comprises:
determining a first time that the pedestrian is expected to enter the region based at least in part on the location of the pedestrian and the first speed;
determining a second time that the pedestrian is expected to exit the region based at least in part on the location of the pedestrian and the first speed; and
determining the first time period based at least in part on the first time and the second time; and
determining the second time period that the pedestrian is expected to be within the region comprises:
determining a third time that the pedestrian is expected to enter the region based at least in part on the location of the pedestrian and the second speed;
determining a fourth time that the pedestrian is expected to exit the region based at least in part on the location of the pedestrian and the second speed; and
determining the second time period based at least in part on the third time and the fourth time.

4. The method of claim 1, further comprising:
determining a buffer value between the vehicle and the pedestrian based at least in part on the first time period and the second time period; and
determining that the buffer value is less than a threshold,
wherein maneuvering the vehicle comprises causing the vehicle to stop before the region based at least in part on the buffer value being less than the threshold.

5. The method of claim 1, further comprising:
determining a buffer value between the vehicle and the pedestrian based at least in part on the first time period and the second time period; and
determining that the buffer value equal to or greater than a threshold,
wherein maneuvering the vehicle comprises causing the vehicle to navigate through the region before the pedestrian based at least in part on the buffer value being equal to or greater than the threshold.

6. The method of claim 1, further comprising:
determining that the location of the pedestrian is outside of the crosswalk,
wherein determining the region in the environment comprises determining, based at least in part on the location of the pedestrian being outside of the crosswalk, the region as starting at the location of the pedestrian and ending at an additional location within the crosswalk.

7. The method of claim 1, further comprising:
determining that the location of the pedestrian is within the crosswalk,
wherein determining the region in the environment comprises determining, based at least in part on the location of the pedestrian being within the crosswalk, the region as starting at an end of the crosswalk and ending at an additional location that is further from the vehicle than the pedestrian.

8. The method of claim 1, further comprising:
determining a trajectory associated with the pedestrian,
wherein determining the region in the environment is further based at least in part on the trajectory.

9. The method of claim 1, further comprising:
determining one or more contextual factors, the one or more contextual factors including at least one of:
the crosswalk being in a crossable state;
the crosswalk being in a non-crossable state;
the vehicle being within the crosswalk; or
the vehicle likely to stop within the crosswalk,
wherein determining the region in the environment is further based at least in part on the one or more contextual factors.

10. The method of claim 1, further comprising:
determining an actual speed associated with the pedestrian,
wherein:
determining the first speed is based at least in part on the actual speed associated with the pedestrian and a deacceleration; and
determining the second speed is based at least in part on the actual speed associated with the pedestrian and an acceleration.

11. A system comprising:
one or more processors; and
one or more computer-readable media storing instructions that, when executed by the one or more processors, cause the system to perform operations comprising:
determining a location of a pedestrian relative to a crosswalk;
determining, based at least in part on the location of the pedestrian relative to the crosswalk, a region in an environment through which a vehicle and the pedestrian pass;
determining a first planned speed associated with the vehicle;
determining a first time period that the vehicle is expected to be within the region based at least in part on the first planned speed;
determining a second planned speed associated with the vehicle;
determining a second time period that the vehicle is expected to be within the region based at least in part on the second planned speed; and
maneuvering the vehicle based at least in part on the first time period and the second time period.

12. The system of claim 11, the operations further comprising:
determining a first velocity associated with the pedestrian;
determining a third time period that the pedestrian is expected to be within the region based at least in part on the first velocity associated with the pedestrian;
determining a second velocity associated with the pedestrian; and determining a fourth time period that the pedestrian is expected to be within the region based at least in part on the second velocity associated with the pedestrian, wherein maneuvering the vehicle is further based at least in part on the third time period and the fourth time period.

13. The system of claim 11, wherein:

determining the first time period that the vehicle is expected to be within the region comprises:

determining a first time that the vehicle is expected to enter region based at least in part on a location of the vehicle and the first planned speed;

determining a second time that the vehicle is expected to exit the region based at least in part on the location of the vehicle and the first planned speed; and determining the first time period based at least in part on the first time and the second time; and determining the second time period that the vehicle is expected to be within the region comprises:

determining a third time that the vehicle is expected to enter the region based at least in part on the location of the vehicle and the second planned speed;

determining a fourth time that the vehicle is expected to exit the region based at least in part on the location of the vehicle and the second planned speed; and determining the second time period based at least in part on the third time and the fourth time.

14. The system of claim 11, the operations further comprising:

determining a distance buffer value between the vehicle and the pedestrian based at least in part on the first time period and the second time period; and determining whether the distance buffer value is equal to or greater than a distance threshold, wherein maneuvering the vehicle is based at least in part on whether the distance buffer value is equal to or greater than the distance threshold.

15. The system of claim 11, the operations further comprising:

determining a time buffer value between the vehicle and the pedestrian based at least in part on the first time period and the second time period; and determining whether the time buffer value is equal to or greater than a time threshold, wherein maneuvering the vehicle is based at least in part on whether the time buffer value is equal to or greater than the time threshold.

16. The system of claim 11, the operations further comprising:

determining that the location of the pedestrian is outside of the crosswalk, wherein determining the region in the environment comprises determining, based at least in part on the location of the pedestrian being outside of the crosswalk, the region as starting at the location of the pedestrian and ending at an additional location within the crosswalk.

17. The system of claim 11, the operations further comprising:

determining that the location of the pedestrian is within the crosswalk, wherein determining the region in the environment comprises determining, based at least in part on the location of the pedestrian being within the crosswalk, the region as starting at an end of the crosswalk and ending at an additional location that is further from the vehicle than the pedestrian.

18. The system of claim 11, the operations further comprising:

determining a trajectory associated with the pedestrian, wherein determining the region in the environment is further based at least in part on the trajectory.

19. The system of claim 11, the operations further comprising:

determining one or more contextual factors, the one or more contextual factors including at least one of:

the crosswalk being in a crossable state;

the crosswalk being in a non-crossable state;

the vehicle being within the crosswalk; or the vehicle likely to stop within the crosswalk, wherein determining the region in the environment is further based at least in part on the one or more contextual factors.

20. One or more non-transitory computer-readable media storing instructions that, when executed by one or more processors, cause a system to perform operations comprising:

determining a location of a pedestrian relative to a crosswalk;

determining, based at least in part on the location of the pedestrian relative to the crosswalk, a region in an environment through which a vehicle and the pedestrian pass;

determining a first time period that the pedestrian is expected to be within the region;

determining a second time period that the pedestrian is expected to be within the region; and maneuvering the vehicle based at least in part on the first time period and the second time period.

* * * * *